(12) United States Patent
Ronning et al.

(10) Patent No.: US 7,165,051 B2
(45) Date of Patent: *Jan. 16, 2007

(54) ELECTRONIC COMMERCE SYSTEM AND METHOD FOR DETECTING FRAUD

(75) Inventors: Joel A. Ronning, Excelsior, MN (US); Kelly J. Wical, Hastings, MN (US)

(73) Assignee: Digital River, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/067,396

(22) Filed: Feb. 22, 2005

(65) Prior Publication Data

US 2005/0154676 A1 Jul. 14, 2005

Related U.S. Application Data

(63) Continuation of application No. 09/372,253, filed on Aug. 11, 1999, now Pat. No. 7,058,597.

(60) Provisional application No. 60/110,952, filed on Dec. 4, 1998.

(51) Int. Cl.
*G06Q 99/00* (2006.01)
*H04K 1/00* (2006.01)
*H04L 9/00* (2006.01)

(52) U.S. Cl. .............................. 705/64; 705/1; 705/39; 705/67; 705/75; 713/176; 713/177; 713/179; 726/2; 726/26

(58) Field of Classification Search .............. 705/1, 705/64, 67, 75; 713/176–179; 726/1–36
See application file for complete search history.

(56) References Cited

U.S. PATENT DOCUMENTS

| | | | |
|---|---|---|---|
| 3,798,605 A | 3/1974 | Feistel | |
| 3,990,710 A | 11/1976 | Hughes | |
| 4,200,770 A | 4/1980 | Hellman et al. | |
| 4,218,582 A | 8/1980 | Hellman et al. | |
| 4,264,782 A | 4/1981 | Konheim | |
| 4,405,829 A | 9/1983 | Rivest et al. | |
| 4,424,414 A | 1/1984 | Hellman et al. | |

(Continued)

FOREIGN PATENT DOCUMENTS

JP 57127249 11/1982

(Continued)

OTHER PUBLICATIONS

Dolinar, Lou, "FTP Programs Help You Navigate The Net" [online], Buffalo News; Buffalo, NY; Jul. 7, 1998, pp. 2 [retrieved on Nov. 8, 2002]. Retrieved from the Internet: <URL: http://proquest.umi.com>>.

(Continued)

*Primary Examiner*—Kambiz Abdi
(74) *Attorney, Agent, or Firm*—North Oaks Patent Agency; Shawn B Dempster

(57) ABSTRACT

An electronic commerce system having a server and an end user machine interacting through a network during an electronic commerce transaction is disclosed. The server includes a software module configured to receive user-entered information via the network including an electronic purchase order for a product within the electronic commerce system. In addition, the server includes a fraud detection mechanism active during electronic commerce transactions. The fraud detection mechanism determines a likelihood that the electronic purchase order is attempted fraud based upon (i) information associated with the user-entered information and (ii) factors relating to a users real-time interaction with the server during a transaction to process the electronic purchase order. A method performed by an electronic commerce system for determining a likelihood that the electronic purchase order is attempted fraud based is also provided.

20 Claims, 14 Drawing Sheets

U.S. PATENT DOCUMENTS

| | | |
|---|---|---|
| 4,446,519 A | 5/1984 | Thomas |
| 4,458,315 A | 7/1984 | Uchenick |
| 4,465,901 A | 8/1984 | Best |
| 4,490,810 A | 12/1984 | Hon |
| 4,528,643 A | 7/1985 | Freeny, Jr. |
| 4,558,302 A | 12/1985 | Welch |
| 4,558,413 A | 12/1985 | Schmidt et al. |
| 4,567,512 A | 1/1986 | Abraham |
| 4,590,557 A | 5/1986 | Lillie |
| 4,649,510 A | 3/1987 | Schmidt |
| 4,654,799 A | 3/1987 | Ogaki |
| 4,658,093 A | 4/1987 | Hellman |
| 4,672,554 A | 6/1987 | Ogaki |
| 4,674,055 A | 6/1987 | Ogaki et al. |
| 4,685,055 A | 8/1987 | Thomas |
| 4,740,890 A | 4/1988 | William |
| 4,780,905 A | 10/1988 | Cruts et al. |
| 4,787,050 A | 11/1988 | Suzuki |
| 4,791,565 A | 12/1988 | Dunham et al. |
| 4,796,220 A | 1/1989 | Wolfe |
| 4,815,030 A | 3/1989 | Cross et al. |
| 4,827,508 A | 5/1989 | Shear |
| 4,864,516 A | 9/1989 | Gaither et al. |
| 4,888,798 A | 12/1989 | Earnest |
| 4,893,248 A | 1/1990 | Pitts et al. |
| 4,918,602 A | 4/1990 | Bone et al. |
| 4,949,257 A | 8/1990 | Orbach |
| 4,974,160 A | 11/1990 | Bone et al. |
| 4,999,806 A | 3/1991 | Chernow et al. |
| 5,006,849 A | 4/1991 | Baarman et al. |
| 5,010,571 A | 4/1991 | Katznelson |
| 5,014,234 A | 5/1991 | Edwards, Jr. |
| 5,016,009 A | 5/1991 | Whiting et al. |
| 5,027,291 A | 6/1991 | Callahan et al. |
| 5,043,885 A | 8/1991 | Robinson |
| 5,047,928 A | 9/1991 | Wiedemer |
| 5,051,745 A | 9/1991 | Katz |
| 5,103,392 A | 4/1992 | Mori |
| 5,103,476 A | 4/1992 | Waite et al. |
| 5,109,413 A | 4/1992 | Comerford et al. |
| 5,166,886 A | 11/1992 | Molnar et al. |
| 5,199,066 A | 3/1993 | Logan |
| 5,222,134 A | 6/1993 | Waite et al. |
| 5,237,157 A | 8/1993 | Kaplan |
| 5,241,671 A | 8/1993 | Reed et al. |
| 5,267,171 A | 11/1993 | Suzuki et al. |
| 5,269,698 A | 12/1993 | Singer |
| 5,293,422 A | 3/1994 | Loiacono |
| 5,327,563 A | 7/1994 | Singh |
| 5,341,429 A | 8/1994 | Stringer et al. |
| 5,355,302 A | 10/1994 | Martin et al. |
| 5,367,667 A | 11/1994 | Wahlquist et al. |
| 5,367,704 A | 11/1994 | Hasuo et al. |
| 5,375,240 A | 12/1994 | Grundy |
| 5,381,539 A | 1/1995 | Yanai et al. |
| 5,386,104 A * | 1/1995 | Sime .................... 235/379 |
| 5,386,369 A | 1/1995 | Christiano |
| 5,388,211 A | 2/1995 | Hornbuckle |
| 5,388,993 A | 2/1995 | McKiel et al. |
| 5,390,297 A | 2/1995 | Barber et al. |
| 5,404,505 A | 4/1995 | Levinson |
| 5,404,510 A | 4/1995 | Smith et al. |
| 5,426,421 A | 6/1995 | Gray |
| 5,426,747 A | 6/1995 | Weinreb et al. |
| 5,430,841 A | 7/1995 | Tannenbaum et al. |
| 5,487,143 A | 1/1996 | Southgate |
| 5,495,411 A | 2/1996 | Ananda |
| 5,509,070 A | 4/1996 | Schull |
| 5,515,538 A | 5/1996 | Kleiman |
| 5,526,485 A | 6/1996 | Brodsky |
| 5,530,865 A | 6/1996 | Owens et al. |
| 5,535,188 A | 7/1996 | Dang et al. |
| 5,537,568 A | 7/1996 | Yanai et al. |
| 5,539,908 A | 7/1996 | Chen et al. |
| 5,557,518 A | 9/1996 | Rosen |
| 5,563,946 A | 10/1996 | Cooper et al. |
| 5,564,038 A | 10/1996 | Grantz et al. |
| 5,579,479 A | 11/1996 | Plum |
| 5,581,764 A | 12/1996 | Fitzgerald et al. |
| 5,598,470 A | 1/1997 | Cooper et al. |
| 5,600,781 A | 2/1997 | Root et al. |
| 5,625,690 A | 4/1997 | Michel et al. |
| 5,627,886 A | 5/1997 | Bowman |
| 5,628,015 A | 5/1997 | Singh |
| 5,629,980 A | 5/1997 | Stefik et al. |
| 5,634,012 A | 5/1997 | Stefik et al. |
| 5,649,186 A | 7/1997 | Ferguson |
| 5,649,187 A | 7/1997 | Hornbuckle |
| 5,654,905 A | 8/1997 | Mulholland et al. |
| 5,671,279 A | 9/1997 | Elgamal |
| 5,671,281 A | 9/1997 | Campbell et al. |
| 5,671,412 A | 9/1997 | Christiano |
| 5,671,420 A | 9/1997 | Bell et al. |
| 5,673,315 A | 9/1997 | Wolf |
| 5,675,645 A | 10/1997 | Schwarz et al. |
| 5,684,996 A | 11/1997 | Westerholm et al. |
| 5,689,560 A | 11/1997 | Cooper et al. |
| 5,696,975 A | 12/1997 | Moore et al. |
| 5,706,435 A | 1/1998 | Barbara et al. |
| 5,710,884 A | 1/1998 | Dedrick |
| 5,710,887 A | 1/1998 | Chelliah et al. |
| 5,715,403 A | 2/1998 | Stefik |
| 5,727,205 A | 3/1998 | Bell et al. |
| 5,727,215 A | 3/1998 | Rynaski et al. |
| 5,737,416 A | 4/1998 | Cooper et al. |
| 5,740,549 A | 4/1998 | Reilly et al. |
| 5,742,757 A | 4/1998 | Hamadani et al. |
| 5,745,574 A | 4/1998 | Muftic |
| 5,745,754 A | 4/1998 | Lagarde et al. |
| 5,745,879 A | 4/1998 | Wyman |
| 5,754,646 A | 5/1998 | Williams et al. |
| 5,754,754 A | 5/1998 | Dudley et al. |
| 5,757,907 A | 5/1998 | Cooper et al. |
| 5,757,908 A | 5/1998 | Cooper et al. |
| 5,758,068 A | 5/1998 | Brandt et al. |
| 5,761,308 A | 6/1998 | Torii et al. |
| 5,761,651 A | 6/1998 | Hasebe et al. |
| 5,768,527 A | 6/1998 | Zhu et al. |
| 5,768,528 A | 6/1998 | Stumm |
| 5,768,597 A | 6/1998 | Simm |
| 5,771,347 A | 6/1998 | Grantz et al. |
| 5,778,234 A | 7/1998 | Hecht et al. |
| 5,781,785 A | 7/1998 | Rowe et al. |
| 5,784,461 A | 7/1998 | Shaffer et al. |
| 5,794,052 A | 8/1998 | Harding |
| 5,796,825 A | 8/1998 | McDonnal et al. |
| 5,805,699 A | 9/1998 | Akiyama et al. |
| 5,805,898 A | 9/1998 | Barsness et al. |
| 5,826,245 A | 10/1998 | Sandberg-Diment |
| 5,835,721 A | 11/1998 | Donahue et al. |
| 5,842,024 A | 11/1998 | Choye et al. |
| 5,845,074 A | 12/1998 | Kobata |
| 5,848,154 A | 12/1998 | Nishio et al. |
| 5,859,969 A | 1/1999 | Oki et al. |
| 5,860,074 A | 1/1999 | Rowe et al. |
| 5,864,620 A | 1/1999 | Pettitt |
| 5,870,543 A | 2/1999 | Ronning |
| 5,875,247 A | 2/1999 | Nakashima et al. |
| 5,883,954 A | 3/1999 | Ronning |
| 5,883,955 A | 3/1999 | Ronning |
| 5,887,060 A | 3/1999 | Ronning |
| 5,887,192 A | 3/1999 | Nishio |
| 5,889,860 A | 3/1999 | Eller et al. |
| 5,897,622 A | 4/1999 | Blinn et al. |

| | | | |
|---|---|---|---|
| 5,903,647 A | 5/1999 | Ronning | |
| 5,903,896 A | 5/1999 | Waldman et al. | |
| 5,907,617 A | 5/1999 | Ronning | |
| 5,912,902 A | 6/1999 | Monroe | |
| 5,913,040 A | 6/1999 | Rakavy et al. | |
| 5,915,019 A | 6/1999 | Ginter et al. | |
| 5,915,023 A | 6/1999 | Bernstein | |
| 5,919,247 A | 7/1999 | Van Hoff et al. | |
| 5,940,834 A | 8/1999 | Pinard et al. | |
| 5,956,483 A | 9/1999 | Grate et al. | |
| 5,974,443 A | 10/1999 | Jeske | |
| 5,982,891 A | 11/1999 | Ginter et al. | |
| 5,983,227 A | 11/1999 | Nazem et al. | |
| 5,987,454 A | 11/1999 | Hobbs | |
| 5,987,480 A | 11/1999 | Donohue et al. | |
| 5,999,912 A | 12/1999 | Wodarz et al. | |
| 6,012,087 A | 1/2000 | Freivald et al. | |
| 6,021,276 A | 2/2000 | Demke et al. | |
| 6,023,698 A | 2/2000 | Lavey et al. | |
| 6,026,369 A | 2/2000 | Capek | |
| 6,026,413 A | 2/2000 | Challenger et al. | |
| 6,029,141 A | 2/2000 | Bezos et al. | |
| 6,029,144 A | 2/2000 | Barrett et al. | |
| 6,029,154 A * | 2/2000 | Pettitt | 705/44 |
| 6,044,471 A | 3/2000 | Colvin | |
| 6,049,892 A | 4/2000 | Casagrande et al. | |
| 6,073,124 A | 6/2000 | Krishnan et al. | |
| 6,108,642 A | 8/2000 | Findley | |
| 6,128,655 A | 10/2000 | Fields et al. | |
| 6,141,006 A | 10/2000 | Knowlton et al. | |
| 6,157,917 A | 12/2000 | Barber | |
| 6,185,608 B1 | 2/2001 | Hon et al. | |
| 6,199,107 B1 | 3/2001 | Dujari | |
| 6,223,166 B1 | 4/2001 | Kay | |
| 6,226,618 B1 | 5/2001 | Downs et al. | |
| 6,233,565 B1 | 5/2001 | Lewis et al. | |
| 6,240,396 B1 | 5/2001 | Walker et al. | |
| 6,253,186 B1 | 6/2001 | Pendleton et al. | |
| 6,263,353 B1 | 7/2001 | Gross et al. | |
| 6,263,446 B1 | 7/2001 | Kausik et al. | |
| 6,289,452 B1 | 9/2001 | Arnold et al. | |
| 6,314,408 B1 | 11/2001 | Salas et al. | |
| 6,317,723 B1 | 11/2001 | Walker et al. | |
| 6,330,546 B1 * | 12/2001 | Gopinathan et al. | 705/35 |
| 6,336,098 B1 | 1/2002 | Fortenberry et al. | |
| 6,385,596 B1 | 5/2002 | Wiser et al. | |
| 6,389,541 B1 | 5/2002 | Patterson | |
| 6,396,805 B1 | 5/2002 | Romrell | |
| 6,405,175 B1 | 6/2002 | Ng | |
| 6,463,418 B1 | 10/2002 | Todd | |
| 6,473,740 B1 | 10/2002 | Cockrill et al. | |
| 6,505,171 B1 | 1/2003 | Cohen et al. | |
| 6,529,885 B1 | 3/2003 | Johnson | |
| 6,601,047 B1 | 7/2003 | Wang et al. | |
| 6,622,168 B1 | 9/2003 | Datta | |
| 6,697,948 B1 | 2/2004 | Rabin et al. | |
| 6,845,453 B1 * | 1/2005 | Scheidt et al. | 726/5 |
| 2002/0023054 A1 | 2/2002 | Gillespie | |
| 2002/0091555 A1 | 7/2002 | Leppink | |
| 2002/0133637 A1 | 9/2002 | Popp et al. | |
| 2002/0161711 A1 | 10/2002 | Sartor et al. | |
| 2003/0028481 A1 | 2/2003 | Flitcroft et al. | |
| 2003/0055781 A1 | 3/2003 | Ong | |

FOREIGN PATENT DOCUMENTS

| | | |
|---|---|---|
| JP | 60077218 | 9/1985 |
| JP | 03083132 | 6/1991 |
| WO | WO99/49424 | 6/1999 |
| WO | WO00/23909 | 4/2000 |

OTHER PUBLICATIONS

Woollacott, et al., "Web Spoofing poses new security threat" [online], InfoWorld, Framingham, Jan. 6, 1997 [retrieved on Nov. 8, 2002]. Retrieved from the Internet: <URL: http://proquest.umi.com>>.

"Computer Dictionary", Microsoft Press, Redmond, Washington, 1997, p. 119, heading "COOKIE".

"The Internet Complete Reference", Osborne McGraw Hill, California.

"Inktomi Powers Advanced Information Indexing: SmartCrawl Technology Offers Turnkey Solution to Rapidly Index Web Site Content," Inktomi Press Release, (Dec. 11, 1996). New York.

Inktomi Unveils Smart Network Strategy to Alleviate Network Overload and Enhance Global Information Access: "Traffic Servers Are Key to Reducing Redundant Net Traffic," Inktomi Press Release, (Apr. 14, 1997), Berkeley, CA.

"PointCast Unveils First News Network that Reaches Viewers at Their Desktops: Major Industry Players Embrace "Pointcasting" Comgbines the Timeliness of Broadcast with the Power of the Internet to Deliver Personalized News Instantly." PointCast Press Releases, (Feb. 13, 1996), San Francisco, CA.

"Lotus and PointCast to Collaborate on Interactive Information Delivery System for Corporate Intranets: Companies Will Link PointCasts's SmartScreen and I-Server Technology With Lotus Domino Intranet Server and the World Wide Web." PointCast Press Releases, (Jul. 23, 1996), Cambridge, MA/Cupertino, CA.

"PointCast and Infoseek Collaborate to Offer Additional Personalized Content on the PointCast Network: Infoseek Search Technology Enhances PointCast Network Viewer Experience With Instant Search Capabilities." PointCast Press Releases, (Aug. 5, 1996), Cupertino, CA.

"Department of Defense Chooses software.net for Electronic Ordering and Fulfillment Over the Internet:: software.net Opens the Microsoft Government Express! Center for Volume Discount Pricing on Microsoft Products," software.net Press Release, (Apr. 3, 1996), Washington, DC.

"CyberSource Corp. Selected as Electronic Distributor for Over 2,100 Adobe Fonts: First Time Consumers Have Immediate Availability of the Latest Fonts From Adobe Type Library," software.net Press Release (Jun. 18, 1996), Menlo Park, CA.

"CyberSource and Online Interactive Help Microsoft Meet Heavy Demand for Its Frontpage Software: Electronic Resellers Deliver on the Promise of Electronic Software Distribution," software.net Press Release, (Aug. 6, 1996), Menlo Park, CA/Seattle, WA.

"software.net and Microsoft Link Largest Electronic Software Distribution Deal in Internet History: Defense Logistics and Department of Defense Procurement Agencies Receive Software Via the Internet, Enabling the U.S. Government to Avoid an Estimated $30 Million and Reducing Delivery Times to a Single Day," (Jul. 1, 1997), San Jose, CA.

Prosise, J., PC Magazine-DOS 5 Techniques and Utilities, Ziff-Davis Press, Emeryville, CA 94608: 82-85.

Prosise, J., "PC Magazine—DOS 5 Techiques and Utilities," pp. 365-367, Ziff-Davis Press, PC Magazine, Emeryville, CA, 1991.

Amanda Mitchell, "Chicago Features Spark Online Distribution," Computer Reseller News, (Aug. 1994), p. 101.

"Testdrive Founder/CEO Resigns to Form New Info Highway Company," Business Wire, (Jun. 1994), Cupertino, CA.

Don Clark, "Multimedia: Patents May Raise Price of Information Highway," The Wall Street Journal, (Nov. 1993).

Walter S. Mossberg, "Personal Technology," The Wall Street Journal, (Dec. 1993), p. 12.

"Try and Buy on CD-ROM," Marketing Computers, (Oct. 1993), p. 12.

"Multimedia World," Advertising Age, (Aug. 1993), p. 23.

File History of U.S. Pat. No. 5,768,528, issued Jun. 16, 1998.
File History of U.S. Pat. No. 5,761,651, issued Jun. 2, 1998.
File History of U.S. Pat. No.4,658,093, issued Apr. 14, 1987.
File History of U.S. Pat. No. 4,740,890, issued Apr. 26, 1988.

* cited by examiner

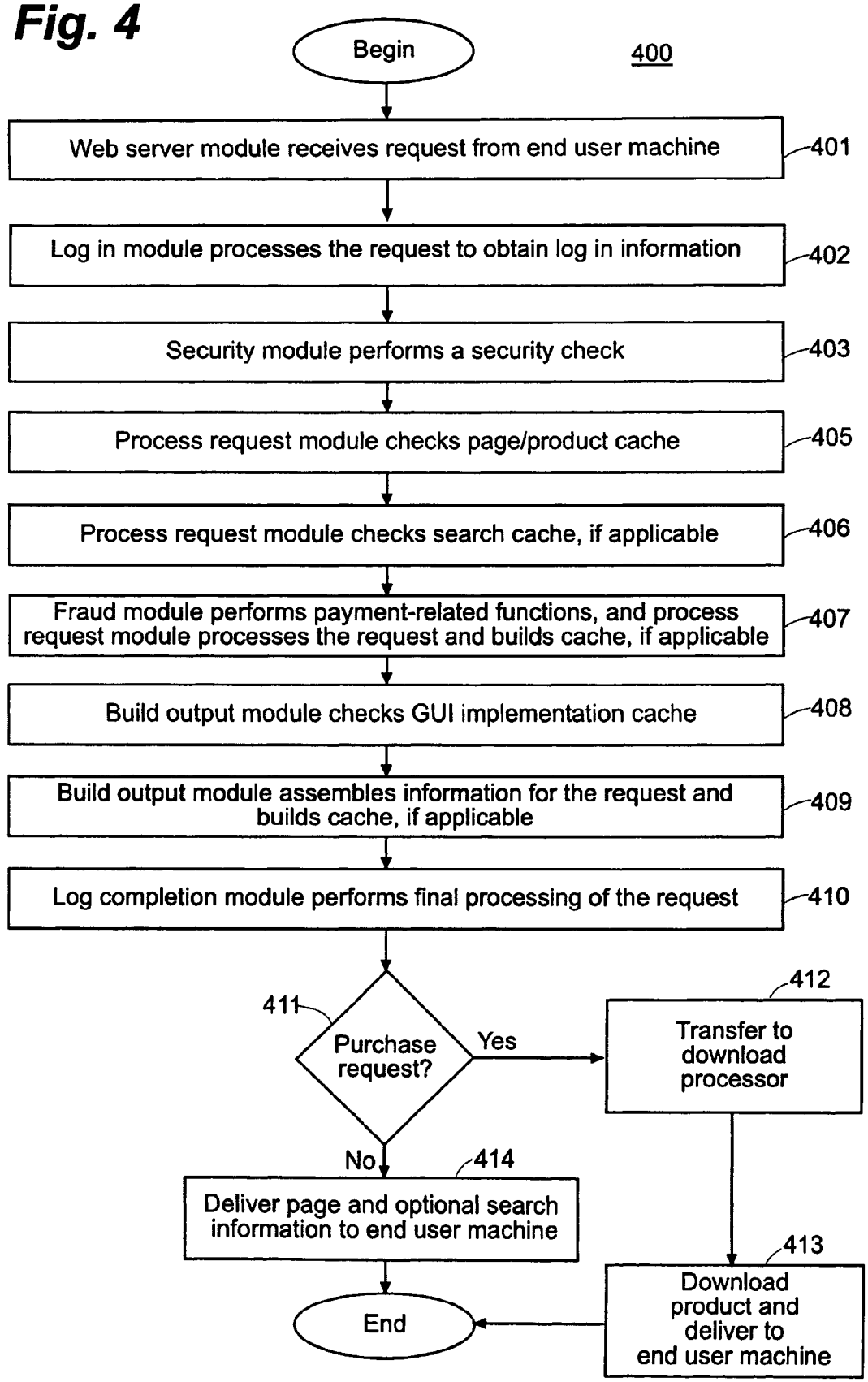

FIG. 5B

520 → To complete your secure online order, please enter your billing information below.

521 → First name [ ]   Last name [ ]

522 → Company [ ]

523 → Address [ ]   Apt./Suite [ ]
City [ ]   State [Select]
Zip [ ]
(or postal code)

Country [ ]

524 → Phone [ ] [ ]
(plus area code)

525 → Email Address [ ]

We Accept:   [credit card icons]

526 → Credit Card Number [ ]

Expiration Date   Month [ ]   Year [ ]

Important:

• Please assign yourself a password, and write it down for future use.
 • Passwords should be a least 4 characters in length.
 • Please use the characters A-Z and 0-9 only.

527 → Password [ ]

Verify Password [ ]

[Submit] ← 528

ELECTRONIC COMMERCE SYSTEM AND METHOD FOR DETECTING FRAUD

CROSS REFERENCE TO RELATED APPLICATIONS

The present application is a continuation of U.S. patent application Ser. No. 09/372,253, filed Aug. 11, 1999 now U.S. Pat. No. 7,058,597, and entitled "Apparatus and Method for Adaptive Fraud Screening for Electronic Commerce Transactions", which claims the benefit of U.S. Provisional Patent Application Ser. No. 60/110,952, filed Dec. 4, 1998, and entitled "Apparatus and Method for Providing Electronic Commerce" under 35 U.S.C. 119(e).

FIELD OF THE INVENTION

The present invention relates to an apparatus and method for performing adaptive fraud screening for electronic commerce transactions in order to detect and prevent attempted fraud in conjunction with the transactions.

BACKGROUND OF THE INVENTION

Electronic commerce involves transactions occurring through the World Wide Web, referred to as the web, over the Internet. These transactions typically involve the purchase of products by consumers. Sellers or retailers may maintain web sites, and consumers may electronically access those web sites in order to view descriptions of products. Permitting users or consumers to purchase products results in certain advantages for both sellers and consumers. A seller need not incur the expense of maintaining a retail store and therefore may also store the products for sale in a location having reduced warehousing expenses. The consumers may shop via their computers and therefore need not visit retail stores to make purchases, potentially saving them time. Also, electronic sales of products may typically occur at anytime, meaning that a consumer need not only shop during certain retail hours.

Electronic sales also involve potentially different retailer concerns than compared with physical retail stores. For instance, when users enter credit card numbers and transmit those numbers over the Internet, the on-line retailer should safeguard the numbers in order to prevent others from obtaining them. In addition, when products are distributed in electronic form, an on-line retailer should protect the products to prevent unauthorized access and distribution of the products.

Accordingly, a need exists for secure electronic commerce to prevent fraudulent attempts to obtain products.

SUMMARY OF THE INVENTION

An electronic commerce system having a server and an end user machine interacting through a network during an electronic commerce transaction is disclosed. The server includes a software module configured to receive user-entered information via the network including an electronic purchase order for a product within the electronic commerce system. In addition, the server includes a fraud detection mechanism active during electronic commerce transactions. The fraud detection mechanism determines a likelihood that the electronic purchase order is attempted fraud based upon (i) information associated with the user-entered information and (ii) factors relating to a user's real-time interaction with the server during a transaction to process the electronic purchase order. A method performed by an electronic commerce system for determining a likelihood that the electronic purchase order is attempted fraud based is also provided.

DESCRIPTION OF THE DRAWINGS

The accompanying drawings are incorporated in and constitute a part of this specification and, together with the description, explain the advantages and principles of the invention. In the drawings.

FIG. 4 is a flow chart of processing for an electronic commerce system;

FIG. 5B is a diagram of an exemplary order form used for electronic commerce transactions;

DETAILED DESCRIPTION

Overview

Figure 1:
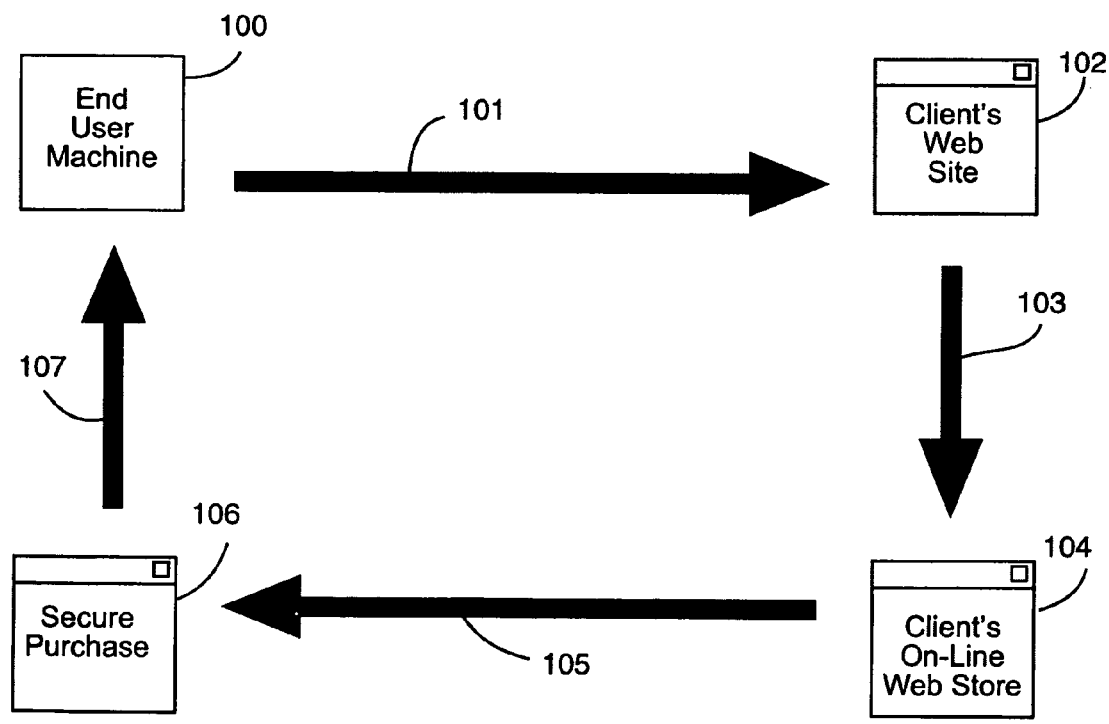
FIG. 1 is a block diagram of an environment for providing electronic commerce.

As shown in FIG. 1, an end user at computer 100 enters a particular client web site 102 through connection 101 in order to shop for products, which may include, but is not necessarily limited to, digital products. Digital products include any information capable of being represented in digital form; examples of digital products include, but are not limited to, the following: software applications; data, music, video, books, text, audio-visual information, multimedia information, graphical information, fonts, and artistic works.

The end user may view a page from the client's web site, for example, listing and describing various products. When the end user indicates a desire to purchase a product by, for example, selecting a purchase icon on the client's web page, the end user's connection 103 is transferred to a commerce network server providing the client's on-line web store 104, and this typically occurs as a background process. The end user may make a secure purchase 105 through page 106 from a product library and, as represented by arrow 107, the purchased product is delivered electronically over the network connection, physically such as by mail, or both electronically and physically.

The purchase typically involves the end user entering payment and related information, such as a credit card number and an associated name and address. In response, the commerce network server determines whether to accept the order and, if accepted, may provide a secure download of the purchased product to the end user's computer for digital products. Determining whether to accept or decline the order involves the use of accessing information concerning prior attempted purchases using information related to or associated with the information in the order, and determining from the related or associated information the likelihood that the order involves a fraudulent attempt to obtain products. Although only one computer 100 and web site 102 are shown, a commerce network server may provide multiple on-line web stores 104 and may interact with end users at multiple computers and multiple web sites.

Electronic Commerce System and Process

Figure 2:
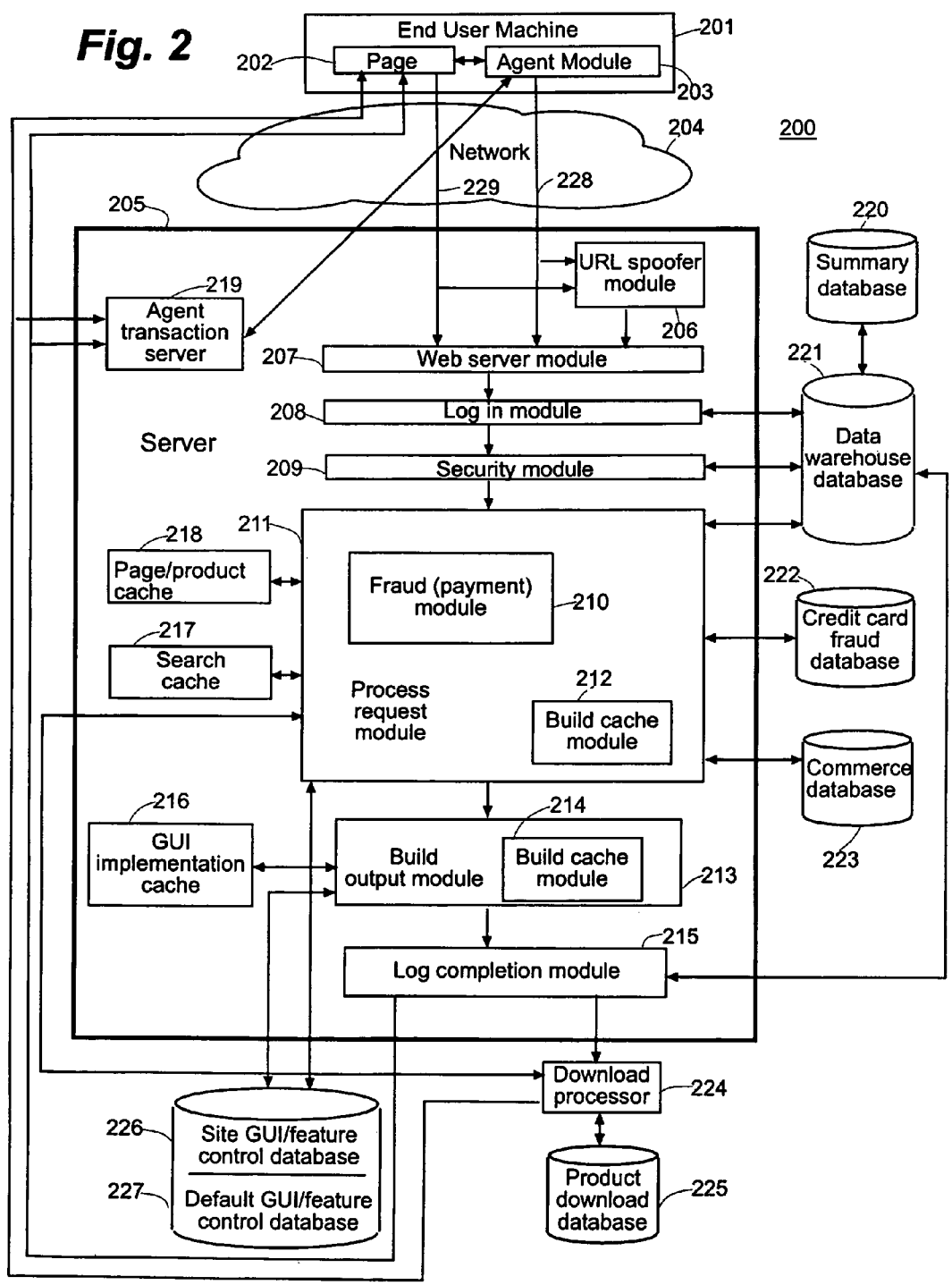
FIG. 2 is a block diagram of an electronic commerce system.

FIG. 2 is a block diagram of an electronic commerce system 200 illustrating interaction between an end user machine 201 and a server 205, illustrating exemplary software modules, caches, and related databases. Server 205 may correspond with the commerce network server described above providing on-line web stores. As shown, end user machine 201 interacts through network 204, such as the Internet or other type of network, with server 205. End user machine 201 may also access a web page on an intermediate server and subsequently be transferred to server 205. End user machine 201 may interact directly with server 205 or interact through an agent module 203, which performs processing specific to a user at end user machine 201. End user machine 201 transmits a request 228 or 229 to server 205 from agent module 203 or page 202, possibly including a request for a particular web page, a request to purchase and download a digital product, or a request for a search for a particular product. Although only one end user machine 201 is shown, server 205 may interact via network 204 with multiple end user machines and multiple intermediate servers maintaining web sites accessed by users at the end user machines. Other examples of systems providing electronic commerce are disclosed in the following United States patents, all of which are incorporated herein by reference as if fully set forth: U.S. Pat. Nos. 5,907,617; 5,903,647; 5,887,060; 5,883,955; 5,883,954; and 5,870,543.

In server 205, the request may be transmitted through a uniform resource locator (URL) spoofer module 206, which performs initial processing of the URL. In particular, URL spoofer module 206 changes the URL so that if a user subsequently downloads a product, end user machine 201 by default saves the product under a file name associated with the product but gives no direct access to the physical location on the server. It may also misdirect the user in order to detect attempts to fraudulently obtain products. Alternatively, the request may be transmitted directly to a web server module 207, which performs initial processing on the request.

A log in module 208 receives the request and records certain data associated with the request, such as the user's request, Internet Protocol (TIP) address, date and time, and particular demographic information. The request is then transmitted to a security module 209, which uses heuristics and other techniques in order to detect a person attempting to bypass particular steps of the process, or otherwise receive or access the products without providing payment.

A process request module 211 first checks a page/product cache 218 to determine if the requested web page has been previously requested or, if applicable, the relevant product has been previously requested. If so, process request module 211 accesses information in page/product cache 218 in order to avoid repeatedly generating the same information for the same or a similar request. If applicable, process request module 211 also checks a search cache 217 to determine if the requested search has been previously requested and, if so, it uses information in search cache 217 to generate particular output. A build cache module 212 within process request module 211, if applicable, builds information for storage in either of the caches.

A fraud (payment) module 210, typically within process request module 211, performs processing necessary to conduct the payment transaction, including processing of credit card information. It also records payment-related information.

A build output module 213 next assembles information for the request. It first checks a graphical user interface (GUI) implementation cache 216 to determine if a requested web page has been previously constructed and provided. If so, it may use the information in GUI implementation cache 216 to avoid unnecessary repeated processing of the same information. If applicable, a build cache module 214 within build output module 213 creates information for storage in GUI implementation cache 216.

A log completion module 215 performs final processing on the request. If the request is only for a web page or search, log completion module 215 transmits the web page or search information back to end user machine 201. If end user machine 201 uses agent module 203, log completion module 215 may transmit information to an agent transaction server 219, which constructs and creates the web page based upon that information and transfers it back to agent module 203 for construction of the web page at page 202 on end user machine 201.

If the request included a request for a product, log completion module 215 transmits the request to a download processor 224, which checks with process request module 211 to verify the authenticity of the request and perform a security check. If the request is valid, as determined by information transmitted back from process request module 211, download processor 224 securely transmits the requested product from a product download database 225 to end user machine 201. The transmitted product may be transmitted through agent transaction server 219 if end user machine 201 uses agent module 203.

The following provides a description of each database shown in FIG. 2. A data warehouse database 221 provides log in information along with keys, which provides an index to associated information in a commerce database 223. Commerce database 223 contains data tables storing information related to products and requests, such as a product table, order table, and other such tables. A summary database 220 provides information from the data warehouse database in summary form. Product download database 225 provides products in digital form for retrieval by the download processor. This configuration provides the advantage of storing the products without wrappers or associated passwords, and instead providing for a secure download of the products. Wrappers or associated passwords may still be used, if desired.

A site GUI/feature control database 226 and default GUI/feature control database 227 may be accessed by process request module 211 and build output module 213 for storage and retrieval of information related to web sites.

A credit card fraud database 222 stores credit card transaction information, including credit card processing history, and other information for adaptive fraud screening. Such information may thus be used in performing another security check. For example, the database may store a list of stolen credit card numbers.

Figure 3:
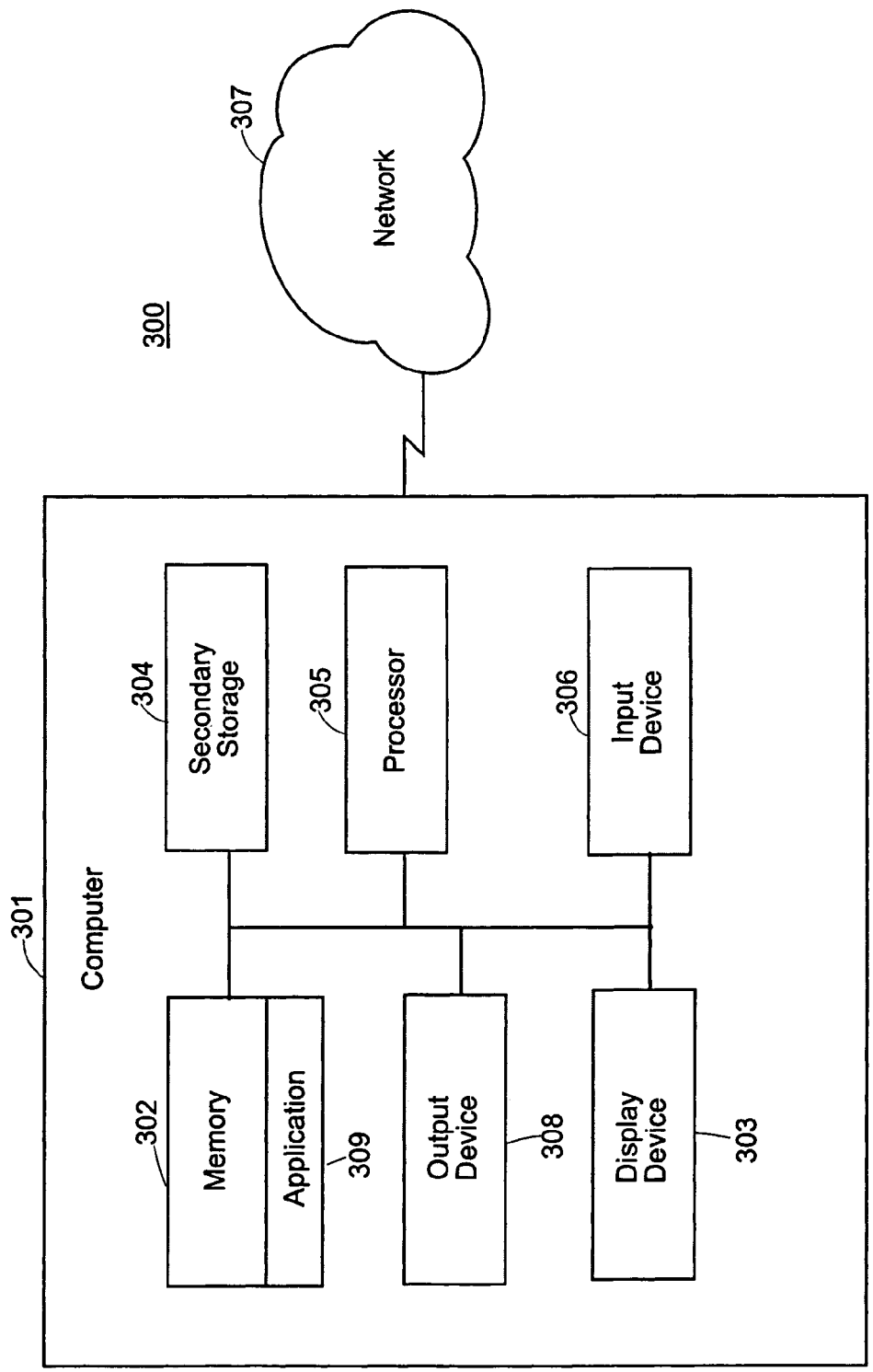
FIG. 3 is a block diagram of exemplary hardware components of an electronic commerce system.

FIG. 3 depicts an exemplary data processing system 300 with a computer 301 illustrating exemplary hardware components of end user machine 201, server 205, and an intermediate server, if used to transfer the end user's connection. Computer 301 includes a connection with a network 307 such as the Internet or other type of network, which may correspond with network 204. Computer 301 typically includes a memory 302, a secondary storage device 304, a processor 305, an input device 306, a display device 303, and an output device 308.

Memory 302 may include random access memory (RAM) or similar types of memory, and it may store one or more applications 309 for execution by processor 305. Applications 309 may correspond with the modules shown in FIG. 2. Secondary storage device 304 may include a hard disk drive, floppy disk drive, CD-ROM drive, or other types of non-volatile data storage, and it may correspond with the various databases shown in FIG. 2. Processor 305 may execute applications or programs stored in memory 302 or secondary storage 304, or received from the Internet or other network 307. Input device 306 may include any device for entering information into computer 301, such as a keyboard, cursor-control device, or touch-screen. Display device 303 may include any type of device for presenting visual information such as, for example, a computer monitor or flat-screen display. Output device 308 may include any type of device for presenting a hard copy of information, such as a printer, and other types of output devices include speakers or any device for providing information in audio form.

Although computer 301 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as computer 301, to perform a particular method.

FIG. 4 illustrates high-level processing 400 through electronic commerce system 200. In process 400, web server module 207 receives a request from end user machine 201 (step 401). Log-in module 208 processes the request to obtain log information (step 402). Security module 209 performs a security check (step 403). Process request module 211 checks page/product cache 218 (step 405) and checks search cache 217, if applicable (step 406). Fraud module 210 performs payment-related functions and process request module 211 processes the request and uses build cache module 212 to build a cache, if applicable (step 407). Build output module 213 checks GUI implementation cache 216 (step 408), assembles information for responding to the request, and uses build cache module 214 to build a cache, if applicable (step 409).

Log completion module 215 performs final processing of the request (step 410), and it determines if the request is a purchase request (step 411). If so, it transfers the request to download processor 224 (step 412), which securely downloads the requested product and delivers it to the end user machine 201 (step 413). If the request was not a purchase request as determined by step 411, log completion module 215 delivers page and optional search information to end user machine 201 (step 414).

Commerce System

This feature of electronic commerce system 200 involves providing a single transaction point for processing of electronic commerce, generally involving the series of modules shown in FIG. 2. Examples of the processing in this single transaction point include security, checking for fraud, on-line reporting, and processing orders. The benefits of providing such processing through a single transaction point typically include, for example, scalability, reliability of processing, simplicity of design by avoiding multiple disparate systems, and avoiding repeated processing.

Fraud Detection and Prevention

This feature of electronic commerce system 200 involves preventing fraud and ensuring security during electronic commerce transactions. An electronic commerce transaction involves a user electronically requesting purchase of a product and providing payment for the product. The user may receive the product electronically for digital products or may receive it by other means such as via mail service. The terms fraud and fraudulent refer to attempts by a user to obtain a product without providing proper payment, or otherwise not satisfying requirements for obtaining a product. For example, a user may attempt to use a stolen or false credit card number to obtain a product or attempt to tamper with the system so that the user obtains a product for less than the required price. As another example, certain information related to a user's order may tend to indicate that the user is likely to fail to provide payment, even if the credit card number used appears valid, and system 200 attempts to make that determination based on an analysis of the user's information and associated information.

The fraud detection and prevention may also involve preventing users or customers from having access to certain stored data such as credit card information and products. It involves preventing users from bypassing particular modules or processing in system 200. Users typically interact with system 200 in a known manner for non-fraudulent transactions. Likewise, particular types of interaction tend to indicate that a user is attempting to circumvent system 200 and fraudulently obtain products. Therefore, system 200 analyzes a user's interaction, as well as a user's information submitted on an order typically using an order form and related information in a database, in order to determine a likelihood or probability that the user is engaging in attempted fraud during the transaction. That determination is used as a basis to either accept or decline the order.

The fraud detection and prevention features of system 200 generally include functions within the security and fraud (payment) modules 209 and 210, as further explained below. System 200 may implement modules 209 and 210, or a single module or any number of modules to implement the features, using software stored in memory 302 or secondary storage 304 for execution by processor 305. Modules 209 and 210 may also be implemented using program products or a combination of software and specialized hardware components. In addition, the modules may be executed on multiple processors for processing a large number of transactions, if necessary or desired.

Figure 5A:
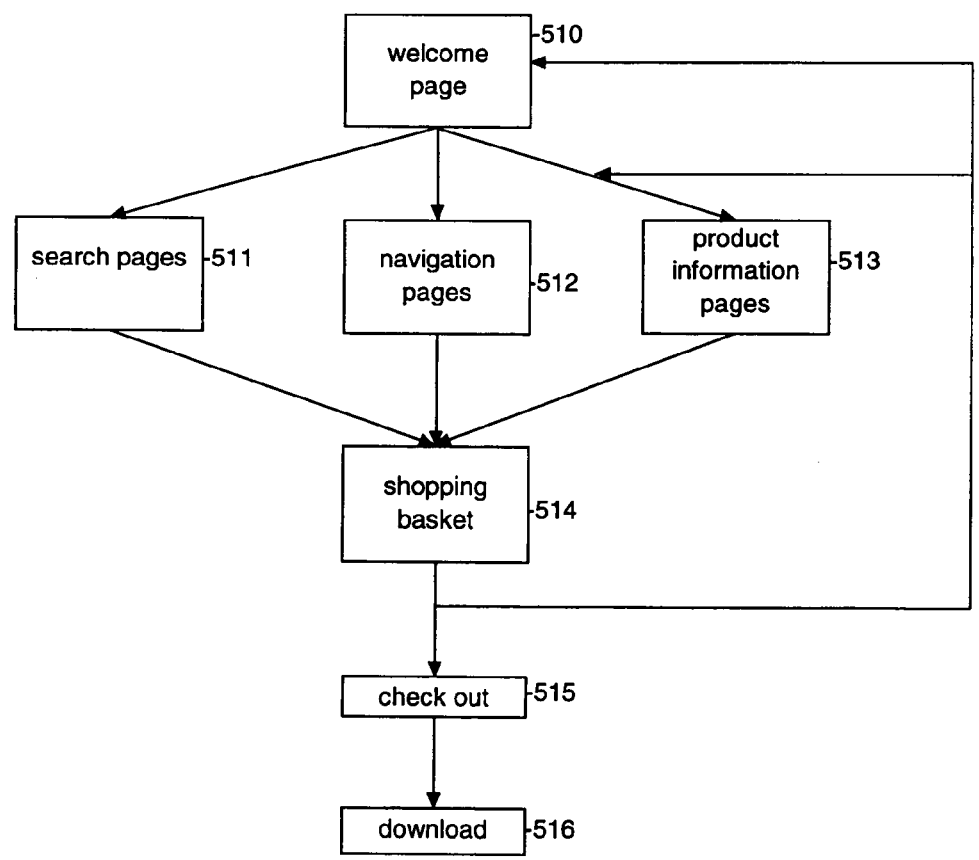
FIG. 5A is a diagram of an example of electronic pages a user may access while interacting with an electronic commerce system.

FIG. 5A is a diagram of a user's typical interaction with an electronic commerce system. This diagram represents a progression of pages viewed or accessed by a user at machine 201 during an electronic commerce transaction. The term "pages" refers to electronic information for display to a user and potentially including links to other pages; examples of pages include web pages, or pages 102, 104, and 106 (see FIG. 1). A progression of pages means which pages the user accessed in interacting with system 200 and potentially includes the sequence of the pages accessed by the user. The pages may be displayed on a display device, such as display device 303, associated with end user machine 201.

A user at machine 201 typically first views a welcome page 510 or some other type of introductory page at client's web site 102, for example. From welcome page 510, the user may perform a number of functions. The user may access search pages 511 in order to search the database for a particular product or type of product. The user may also access navigation pages 512 in order to be routed to particular or desired pages, and the user may view product information pages 513 in order to view information concerning particular products.

A shopping basket page 514 permits the user to enter an identification of products to purchase, and from that page the user may return to welcome page 510 or other pages 511–513 to perform more functions. Upon completion of the electronic shopping, a user may access a check out page 515 in order to enter information required to purchase the products identified in shopping basket page 514 and to request purchase of the products. System 200 determines if the user is attempting a fraudulent transaction and, if not, it downloads the purchased products to the user's machine using a download page 516, if requested for a digital product.

FIG. 5B is a diagram of an exemplary electronic order form 520 used for electronic commerce transactions. Order form 520 is transmitted for display as a page on end user machine 201, such as on display device 303, and permits the user to enter information to place an order, which is an electronic request for purchase of a product including payment-related information. The payment-related information may include any type of information used for or in connection with payment of the requested product; for example, a credit card number or identification of an electronic currency.

Order form 520 includes a number of sections for receiving the following information for use in submitting an order: name section 521; company name section 522; address section 523; phone section 524; e-mail address section 525; credit card number section 526; and password section 527. Typically, a user would have selected a product while viewing another page, such as product information pages, and an identification of the product is saved in an electronic shopping basket and associated with user-entered information in order form 520. Order form 520 also includes a submit section or button 528. Upon selecting button 528 by, for example, using a cursor-control device to "click on" it or by using a particular key stroke, order form 520 including the user-entered information and identification of the ordered product is transmitted to server 205 for processing by security and fraud modules 209 and 210. Order form 520 is typically transmitted using a secure process in order to protect the user's information and, in particular, the credit card number. Examples of such a secure transmission include Secure Sockets Layer protocol, also referred to as SSL, developed by Netscape Communications Corp. Order form 520 is only one example of a form for submitting an order, and other types of electronic forms may be used.

Figure 5C:
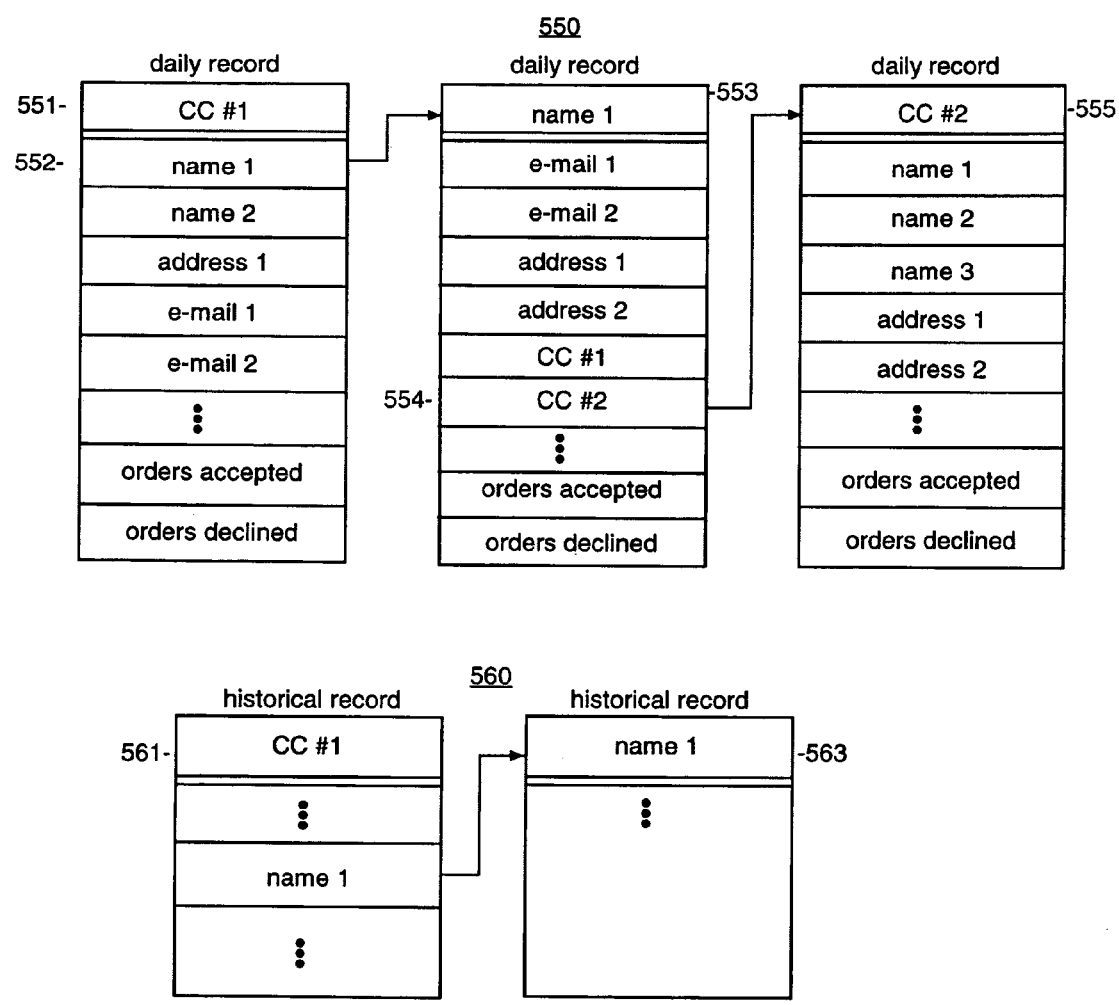
FIG. 5C is a diagram illustrating cross-references between database tables storing 15 information used for electronic commerce transactions.

FIG. 5C is a diagram illustrating cross-references between database tables storing information used for electronic commerce transactions. System 200 maintains both daily records 550 and historical records 560, and may store them among summary database 220, data warehouse database 221, credit card fraud database 222, and commerce database 223. The daily records maintain data only for the current day, meaning the day when an order is received. The historical records maintain data based on all orders processed before the current day. The tables typically record all information submitted in order form 520 for each order. For example, that information may include the following for each order: country; IP address; e-mail address; name and address; identification of the requested product or products; dollar amount of the product or products; and credit card number. The tables may also record a date and time when each order is submitted, as determined by an internal clock of system 200. The tables also typically record processing associated with each order; for example, whether the order was accepted or declined.

As shown in FIG. 5C, daily records 550 may include a table 551 for a first credit card number. Table 551 lists all information that has appeared on an order with the first credit card number, and that information is cross-referenced with other tables. For example, name 552 in table 551 includes a link to a table 553. Table 553 lists all information that has appeared on an order with name 552. Name 552 has been used, for example, with a second credit card number 554, which includes a link to a table 555 listing all information that has appeared on an order with that credit card number.

In addition, each table includes fields for recording the number of orders accepted and the number of orders declined, as associated with the information in the table. The term "orders accepted" means how many orders were approved for sale of the requested product, and the term "orders declined" means how many orders were not approved for sale of the requested product. For example, table 551 includes fields for the number of orders accepted when the first credit card number appeared on the order and likewise the number of orders declined when the first credit card number appeared on the order. By adding the number of accepted and declined orders, system 200 may determine the total orders attempted with a particular piece of information, such as a credit number. By knowing the total orders, the system can calculate ratios of orders accepted to total orders and the ratio of orders declined to total orders, thus determining percentages of orders accepted and declined as associated with a particular piece of information from the order.

Tables 553 and 555 also have fields for recording number of orders accepted and declined in conjunction with the name 1 (552) and credit card #2 (554) appearing on particular orders. By saving such information, system 200 can determine which types of information have previously resulted in declined orders and use that information for generating a likelihood that a particular order is an attempt at fraud. Tables 561 and 563 illustrate that system 200 maintains corresponding tables for historical records 560 in the same manner as for daily records 550.

The tables in records 550 and 560 may store the information in relational database form, and the links between tables may be implemented using foreign keys, or other types of database links or indexing. Relational databases, including cross-referencing of tables, are known in the art. Therefore, system 200 may use the tables to perform database look ups, obtaining all information associated with a particular piece of information. In addition, since each order contains a credit card number, which should be unique, the credit card numbers may be used as a link between all other information from the orders. Records 550 and 560 show only a few tables for illustrative purposes only; system 200 typically includes many tables stored in relational database form. In addition, system 200 may use other types of data structures for storing the daily and historical data such as, for example, objects. System 200 may also record different types of information for use in security and fraud processing.

Figure 5D:
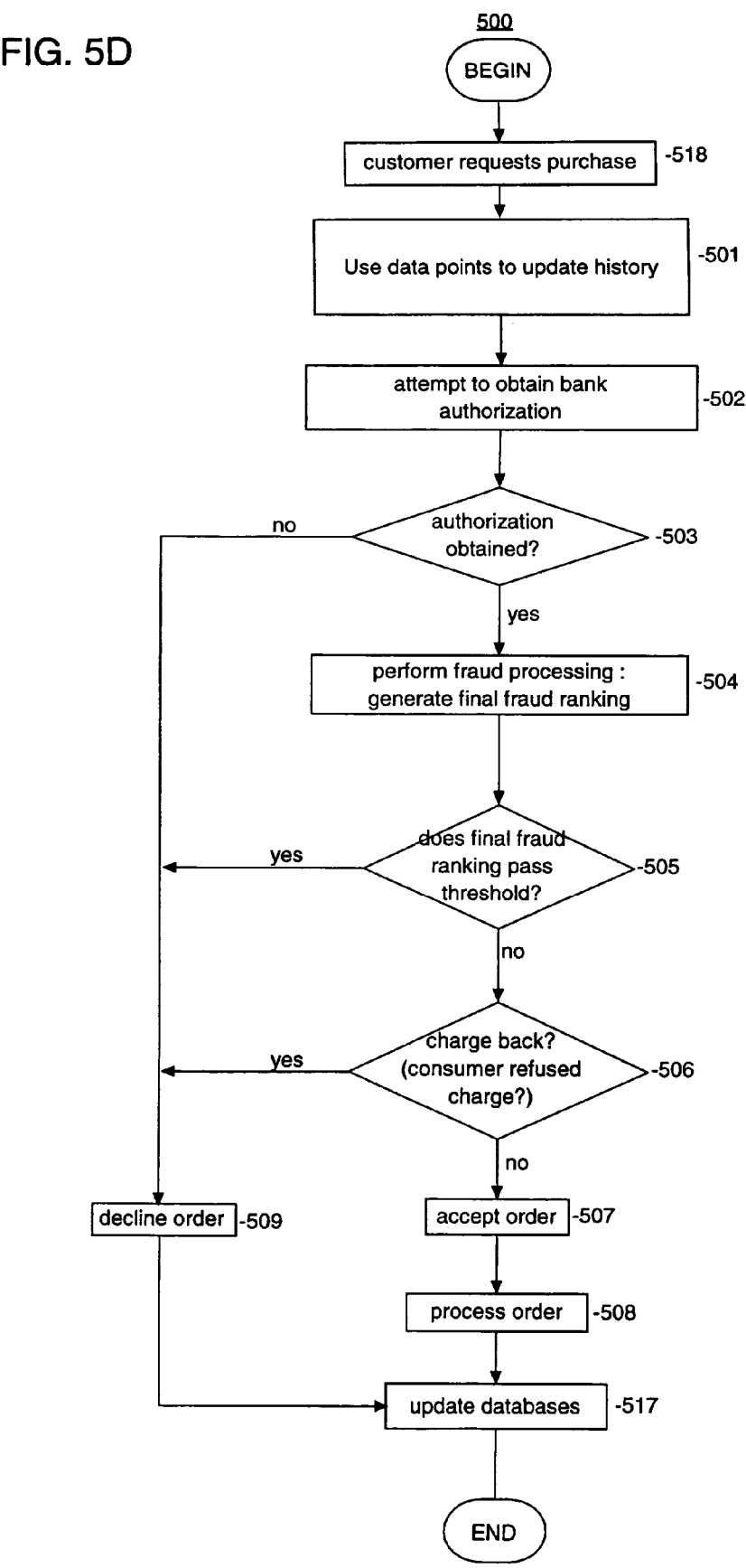
FIG. 5D is a flow chart of an exemplary process for preventing fraud during an electronic commerce transaction.

FIG. 5D is a flow chart of an exemplary process 500 for detecting and preventing fraud during an electronic commerce transaction. Process 500 is triggered by a user submitting an order to request purchase of a product using order form 520, or other order form, at check out page 515 (step 518), typically triggered by selection of submit button 528. System 200 updates the databases to enter the user's information from order form 520 (step 501). Using the user's entered credit card number and other information such as a name and address, system 200 attempts to obtain authorization from the issuing bank for the credit card (step 502). System 200 electronically contacts the bank, submits the information, and waits for a reply, which are known acts with respect to credit card transactions. If authorization is not obtained (step 503), system 200 declines the order (step 509) and typically presents a message to the user indicating the denial. Otherwise, if system 200 obtains bank authorization (step 503), it performs a fraud processing in order to determine a likelihood that the user is attempting a fraudulent transaction (step 504), further explained below. In addition to those functions explained below, the fraud processing may also use an Address Verification System (AVS) to further determine a likelihood of an attempted fraudulent transaction. An AVS is a known system for verifying a valid user of a credit card by comparing a billing address provided during a transaction or order with a valid address on file for that credit card with the issuing bank.

The fraud processing involves generating a fraud ranking based upon the user's information in order form 520 and associated information. The associated information may include any information, or a sub-set of that information, having any type of relation to the information submitted with the order. For example, it typically includes information linked with the submitted information as determined by the relational database tables illustrated in FIG. 5C. It may also include a previous fraud ranking or an AVS rating. System 200 may use the submitted information to perform database look ups to obtain associated information for analysis. The term "fraud ranking" means any type of indication providing a likelihood of attempted fraud involving the submitted order. In this example, the fraud ranking is implemented using a numeric score; however, it may be implemented with other indicators such as symbolic or alpha-numeric rankings.

The fraud processing involves comparing the fraud ranking to a particular fraud scale (step 505); for example, a numeric scale with increasing numbers indicating an increasing likelihood of a fraudulent transaction. In this example, the fraud scale is implemented using a numeric scale of zero to nine; however, different scales may be used depending upon the implementation of the fraud ranking, and the fraud scale may be implemented with any indicators such that comparison of a fraud ranking to the fraud scale provides an indication of a likelihood of attempted fraud. If the user's fraud ranking passes a particular threshold, indicating a likelihood of an attempted fraudulent transaction, system 200 declines the order (step 509). The threshold typically may be established anywhere along the fraud scale based, for example, on empirical evidence. For example, if the system declines too many valid orders, the threshold may be adjusted to permit a higher fraud ranking for accepted orders.

Otherwise, if the fraud ranking does not pass the threshold, system 200 next determines if a charge back occurred (step 506). A charge back means that the user refused the charge on the credit card. If no charge back occurred, system 200 accepts the order (step 507) and processes the order to download or send the purchased product to the user (step 508). System 200 also updates the databases to indicate the approval or denial of the order and the information associated with it (step 517), as illustrated in FIG. 5C. Therefore, if any piece of information used in this transaction is submitted on a future order form, system 200 has saved an indication of whether the information was ever used on an order that was accepted or an order that was declined. In this manner, the system through the saved empirical evidence may continually update the databases and refine the fraud ranking determinations.

Figure 6:
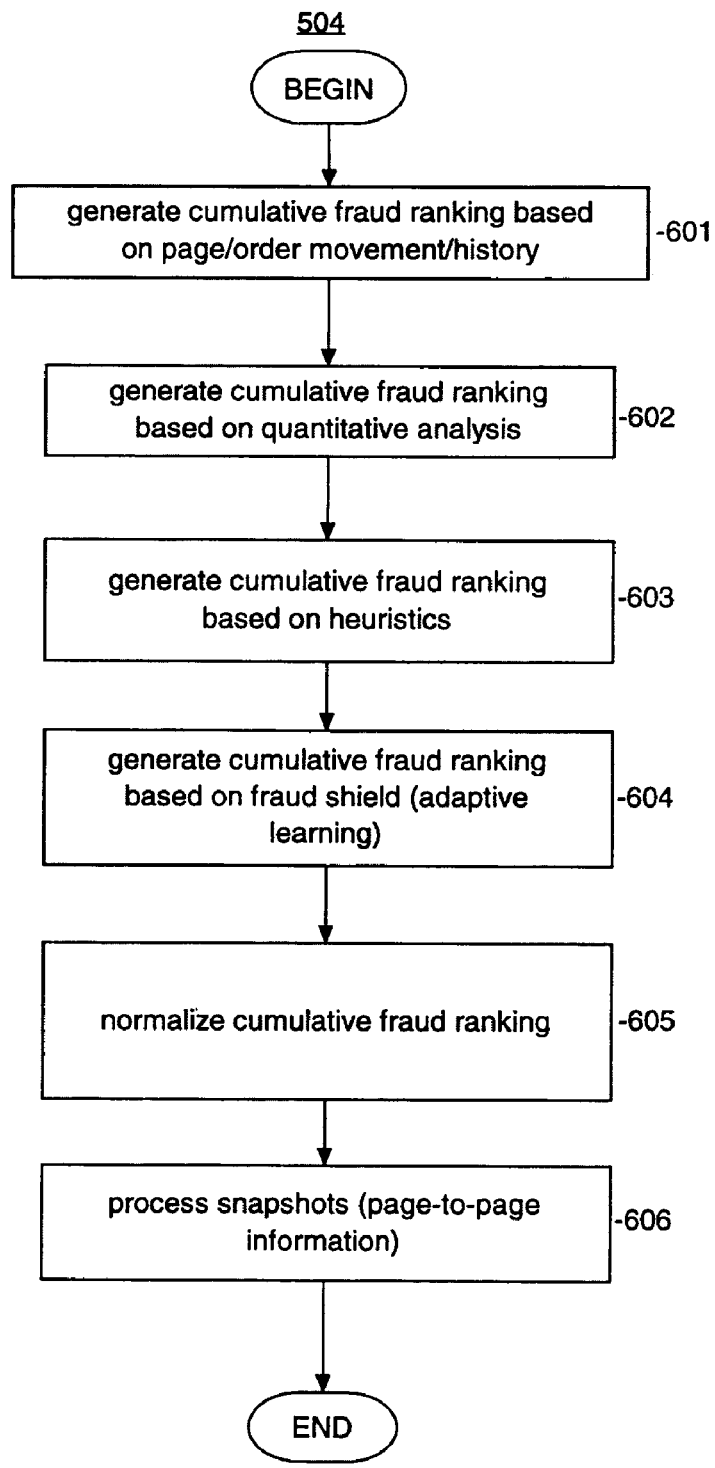
FIG. 6 is a flow chart of an exemplary process used to generate a fraud ranking for use in detecting and preventing fraud during an electronic commerce transaction.

FIG. 6 is a flow chart of process 504 used to generate a cumulative fraud ranking for use in determining a likelihood that a user is attempting a fraudulent transaction. When a user submits an order, system 200 initially assigns to the user a zero fraud ranking. In processing various pieces of information on the order or associated with it, system 200 cumulatively adds points to the fraud ranking to generate the cumulative fraud ranking. The points are added based on various criteria and analysis that provide an indication of a likelihood of fraud. For example, system 200 generates a cumulative fraud ranking for a particular user based on the following, further explained below: a page/order movement history (step 601); a quantitative analysis (step 602); heuristics (step 603); and a fraud shield (step 604).

System 200 may perform steps 601–604 in any particular order to generate the cumulative fraud ranking, and may perform fewer steps to generate it or perform more steps based upon additional criteria. In each of the steps 601–604, empirical evidence may be used to determine the particular number of points to add to the cumulative fraud ranking for each type of analysis. The number of points added may be changed in order to fine-tune the system as additional empirical evidence, for example, indicates that certain information or factors have more importance than others for detecting and preventing attempted fraud. In addition, for highly critical information used to detect and prevent fraud, the system may be configured to add sufficient points so that the cumulative fraud ranking is slightly less than the threshold used in step 505 to determine whether to decline the order. If anything else in the order tends to indicate attempted fraud, any additional points added to the cumulative fraud order will increase it beyond the threshold. Other such techniques may be used to fine-tune the system by manipulating fraud points assigned.

Upon completion of generating the cumulative fraud ranking, system 200 optionally normalizes it, if necessary or desired, in order to generate the final fraud ranking (step 605) for use in the comparison of step 505. The final fraud ranking is generated from any additional processing after completion of the cumulative fraud ranking. For example, in generating the cumulative fraud ranking, system 200 may use a scale of zero to nine hundred and normalize the cumulative fraud ranking by dividing it by one hundred for use on a zero to nine scale. If no additional processing is required, the final fraud ranking may be the same as the generated cumulative fraud ranking. Finally, system 200 processes snapshots (step 606), which as explained below are used to provide an indication of a user attempting a fraudulent transaction by timing of particular events. The term snapshot refers to information identifying contents of a page at a particular time. The snapshots involve saving page information including an order form at various points in the transaction process and comparing later pages with the stored page information to determine if the user has changed anything in the order form.

Figure 7:
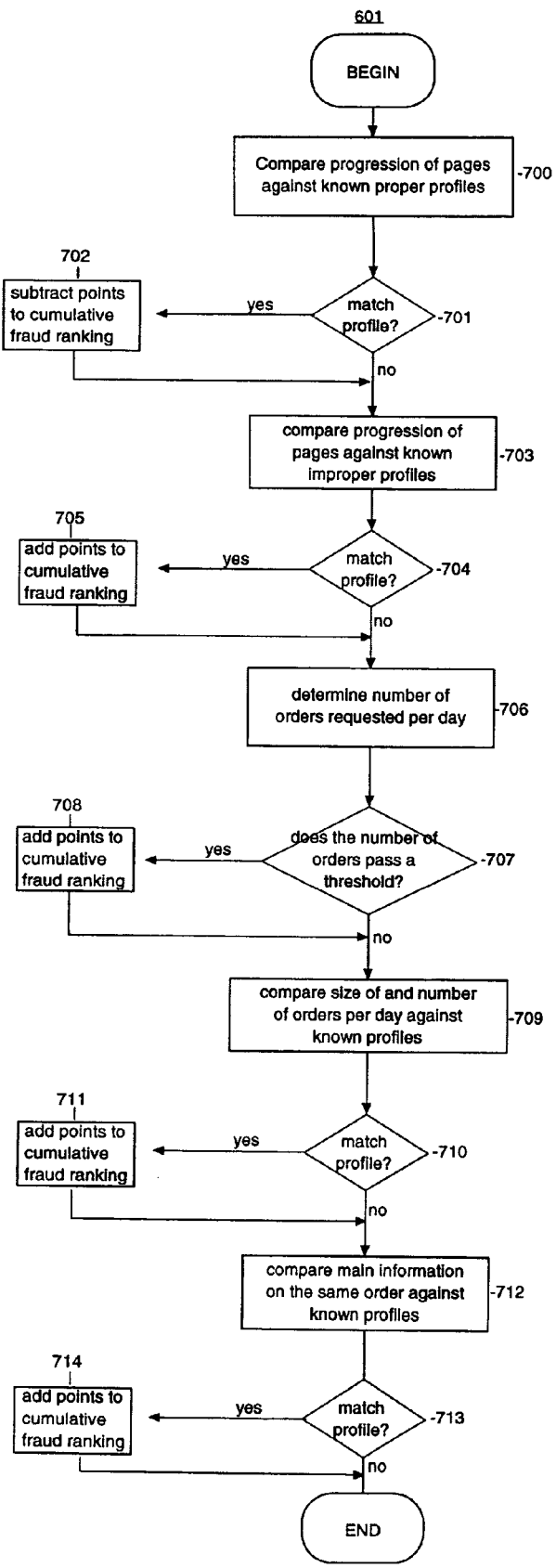
FIG. 7 is a flow chart of an exemplary process for analyzing page/order movement/history of an electronic commerce transaction for use in detecting and preventing fraud.

FIG. 7 is a flow chart of process 601 for generating the cumulative fraud ranking by analyzing page/order movement/history of an electronic commerce transaction. This processing generally involves recording how a user progressed through the transaction, such as the sequence of pages accessed as shown in FIG. 5A, and comparing that progression with known profiles indicating fraudulent transactions and known profiles indicating normal (non-fraudulent) transactions. System 200 stores the known profiles for use in the comparison, and the known profiles may be updated as system 200 records additional profiles and associates them with attempted fraudulent or normal transactions. For example, a progression of pages for a normal transaction may include a user accessing welcome page 510, search page 511, product information page 513, and then check out page 515. A progression of pages for attempted fraudulent transaction may include, for example, a user repeatedly accessing shopping basket page 514 and then check out page 515 several times in a row. In addition, system 200 may include files, known and referred to as "cookies," written to a user's machine to identify the machine in order to detect particular events from the same machine such as, for example, repeated submission of orders from the same machine with potentially different names or other information.

System 200 compares the user's progression of pages against known proper profiles (step 700). A proper profile is one which it has been determined tends to indicate a normal transaction. System 200 determines if the user's progression of pages matches the known proper profiles (step 701); if so, it subtracts points to the cumulative fraud ranking (step 702). System 200 also compares the user's progression of pages against known improper profiles (step 703). An improper profile is one which it has been determined tends to indicate a fraudulent transaction. System 200 determines if the user's progression of pages matches the known proper profiles (step 704); if not, it adds points to the cumulative fraud ranking (step 705).

System 200 also analyzes order history. It determines the number of orders requested per day for this user (step 706) and whether the number of orders passes a particular threshold value (step 707); if so, it adds points to the cumulative fraud ranking (step 708). For example, it may permit a certain number of orders per day without adding fraud points and beyond that number adds points for each additional order. System 200 also compares the size (dollar amount) and number of orders per day for this user against known profiles tending to indicate an attempted fraudulent transaction (step 709), and it determines if the size and number of orders per day matches the known profiles (step 710); if so, it adds points to the cumulative fraud ranking (step 711). For example, very large orders in terms of dollar amount or other currency amount may receive a certain number of fraud points, since large orders may tend to result in more attempted fraud than small orders.

Finally, system 200 compares particular main information on the same order against known profiles indicating attempted fraudulent transactions (step 712), and it determines if the main information matches the known profiles (step 713); if so, it adds points to the cumulative fraud ranking (step 714). For example, it may check to determine if the same order is being repeatedly submitted with different IP addresses or e-mail address and, if so, add a certain number of fraud points to the cumulative fraud ranking.

Figure 8:
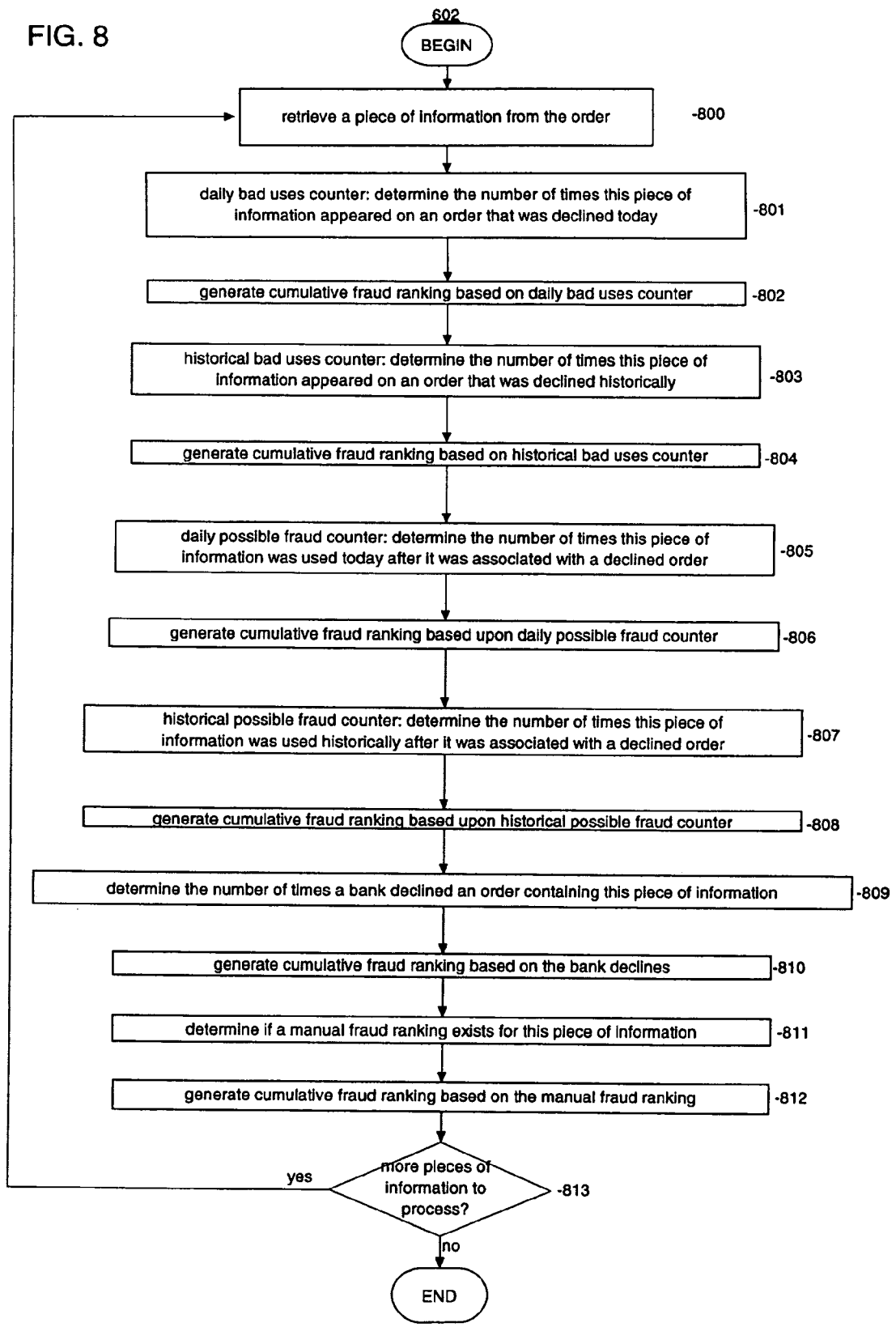
FIG. 8 is a flow chart of an exemplary process for performing quantitative analysis of an electronic commerce transaction for use in detecting and preventing fraud.

FIG. 8 is a flow chart of process 602 for performing quantitative analysis of an electronic commerce transaction. The quantitative analysis involves the use of daily and historical counters for particular pieces of information. System 200 saves information for use on a daily basis, such as how many orders have been submitted using the same name today (meaning the date when an order is submitted and processed), and saves the same type of information historically, such as how many orders have been submitted using the same name any time before today, both illustrated in records 550 and 560 in FIG. 5C. System 200 typically performs the quantitative analysis for all pieces of information in an order, or may alternatively perform the analysis for a sub-set of the pieces of information in the order. A piece of information typically includes the information in any of the sections of an order form such as those shown in FIG. 5B and may include any particular information used in conjunction with an order.

When determining whether to add fraud points, system 200 may use various weighting to add more points if the information is more critical in detecting and preventing fraud. For example, it may determine that of the submitted information for orders the following are less significant and have less or no weighting: the TIP address of the user's e-mail address; the city, state, zip code, and country of the user's address; and any company identified by the user's e-mail address. The other information, in this example, may be deemed more significant and given a particular weighting to increase fraud points added to the cumulative fraud ranking.

In process 602 as shown in FIG. 8, system 200 retrieves a piece of information from the user's submitted order (step 800). System 200 checks a daily bad uses counter by determining the number of times this piece of information appeared on an order that was declined today (step 801). System 200 may make this determination by using the cross-referencing of tables in the database, as explained with respect to FIG. 5C. System 200 generates the cumulative fraud ranking based upon the daily bad uses counter (step 802). In particular, system 200 adds points to the cumulative fraud ranking when the daily bad uses counter for this piece of information passes a particular threshold. The term counter refers to a number of uses of a particular piece of information based upon particular criteria as identified by the corresponding steps.

System 200 also checks an historical bad uses counter by using a database look up to determine the number of times this piece of information appeared on an order that was declined historically, meaning at all times before this order (step 803). System 200 generates the cumulative fraud ranking based upon the historical bad uses counter (step 804). In particular, system 200 adds points to the cumulative fraud ranking when the historical bad uses counter for this piece of information passes a particular threshold. For both the daily and historical bad uses counters, system 200 may be configured to add the same number of fraud points for each occurrence beyond the threshold, or add amounts, such as increasing amounts, for each occurrence beyond the threshold.

System 200 also checks this piece of information against daily and historical possible fraud counters. These counters are used to indicate how many times a particular piece of information was used after it was associated with a declined order, meaning how many times it appeared on a submitted order after it appeared on an order that was declined. System 200 may determine these counters by using database look ups cross-referencing information on the order with associated information. In particular, system 200 checks a daily possible fraud counter by determining how many times this piece of information was used after it was associated with a declined order today (step 805). Based upon the daily possible fraud counter, system 200 generates the cumulative fraud ranking by adding points to it if the counter passes a particular threshold (step 806). System 200 also checks an historical possible fraud counter by determining how many times this piece of information was used after it was associated with a declined order historically (step 807). Based upon the daily possible fraud counter, system 200 generates the cumulative fraud ranking by adding points to it if the counter passes a particular threshold (step 808). For the both the daily and historical possible fraud counters, system 200 may be configured to add the same number of fraud points for each occurrence beyond the threshold, or add amounts, such as increasing amounts, for each occurrence beyond the threshold.

System 200 may also perform other quantitative analysis in potentially adding points to the cumulative fraud ranking. For example, system 200 determines the number of times a bank declined an order containing this piece of information, meaning it did not provide credit card authorization (step 809). System 200 generates the cumulative fraud ranking based upon the bank declines by adding points to the cumulative fraud ranking if the number of bank declines passes a particular threshold (step 810).

System 200 also determines, for example, if a manual fraud ranking exists for this piece of information (step 811). Certain types of information may have such a high probability of being used on an attempted fraudulent order that having a manual fraud setting provides useful for adding a certain number of points to the cumulative fraud ranking or even adding enough points so that system 200 will decline the order based solely on this piece of information. If a manual fraud ranking exists for this piece of information, system 200 generates the cumulative fraud ranking based upon the manual fraud ranking by adding the number of predetermined points to the cumulative fraud ranking for this piece of information (step 812).

System 200 then determines if more pieces of information to process exist on the order (step 813). If so, system 200 repeats steps 800–813 to perform quantitative analysis for the next piece of information. System 200 typically knows the various sections on an order form used to submit an order, such as order form 520, and may be configured to process the pieces of information in the sections in a predetermined sequence.

Figure 9:
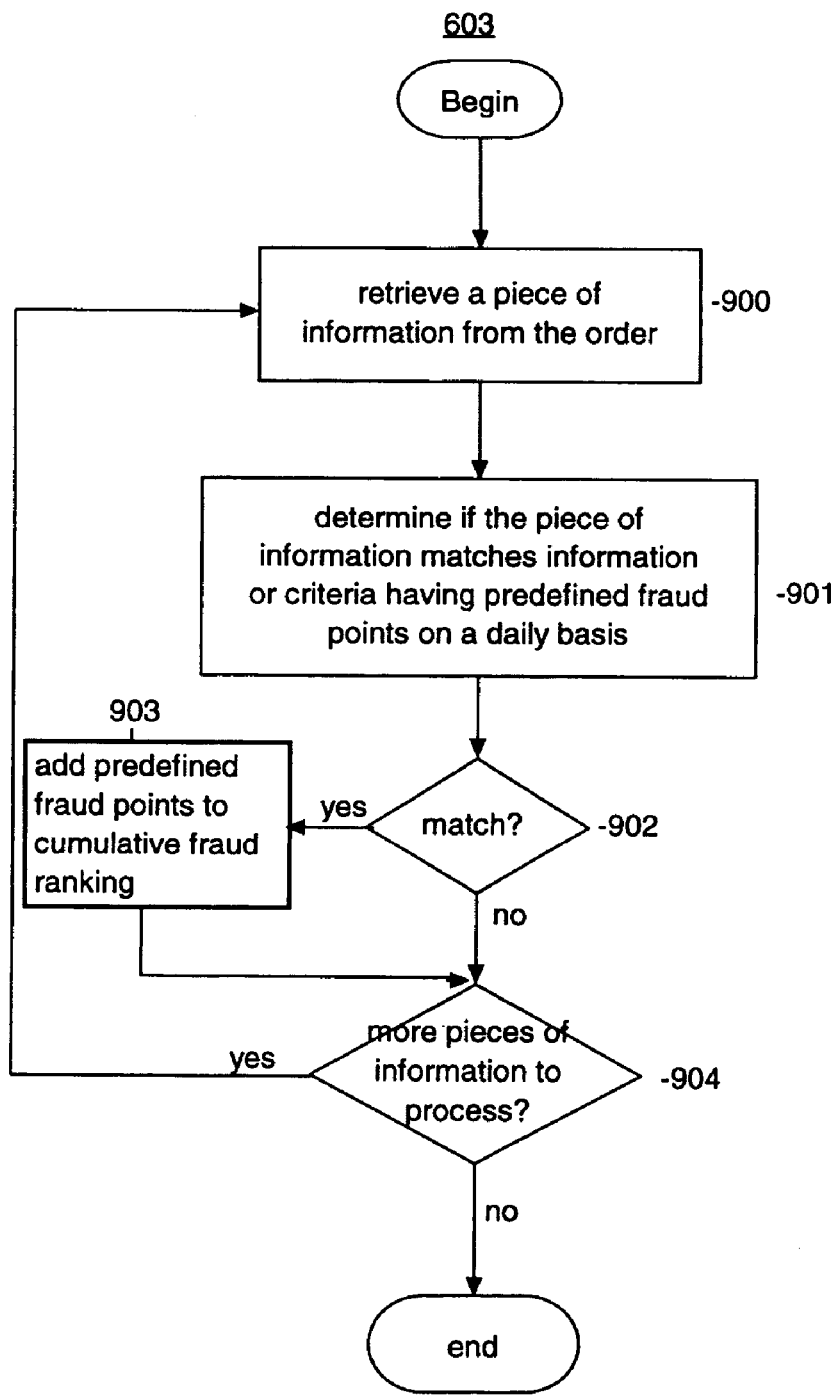
FIG. 9 is a flow chart of an exemplary process for analyzing heuristics of an electronic commerce transaction for use in detecting and preventing fraud.

FIG. 9 is a flow chart of process 603 for analyzing heuristics related to information on an order being processed. The heuristics are generally performed, for example, on a daily basis using information in the associated databases recording daily information, as illustrated in records 550 in FIG. 5C. As shown in FIG. 9, system 200 retrieves a piece of information from the order (step 900) and determines if this piece of information matches information or criteria having predefined fraud points on a daily basis (steps 901 and 902). If it matches, system 200 adds predefined fraud points to the cumulative fraud ranking (step 903). System 200 determines if more pieces of information for processing exists on the order (step 904) and, if so, it repeats steps 900–904.

Information and criteria having predefined fraud points may be based on information or circumstances surrounding an order that would tend to indicate attempted fraud. Examples of information or criteria that may have predefined fraud points include the following: unusual names or names that appear fictitious; a high dollar amount on the order; a particular time of day when the order is submitted; a particular requested product; use of a post office box in a large city; a credit card number issuing bank not located in the country listed on the order; and use of a credit card that is not from a location of the user's service provider as determined by the user's entered e-mail address. System 200 may save such information in the databases for comparison with information in the submitted order to determine if a match exists. As another example, certain web sites permit a user to look up a post office address assigned to a particular name; if the user's name does not match the address listed on the order, system 200 may add a certain number of fraud points to the cumulative fraud ranking.

Figure 10:
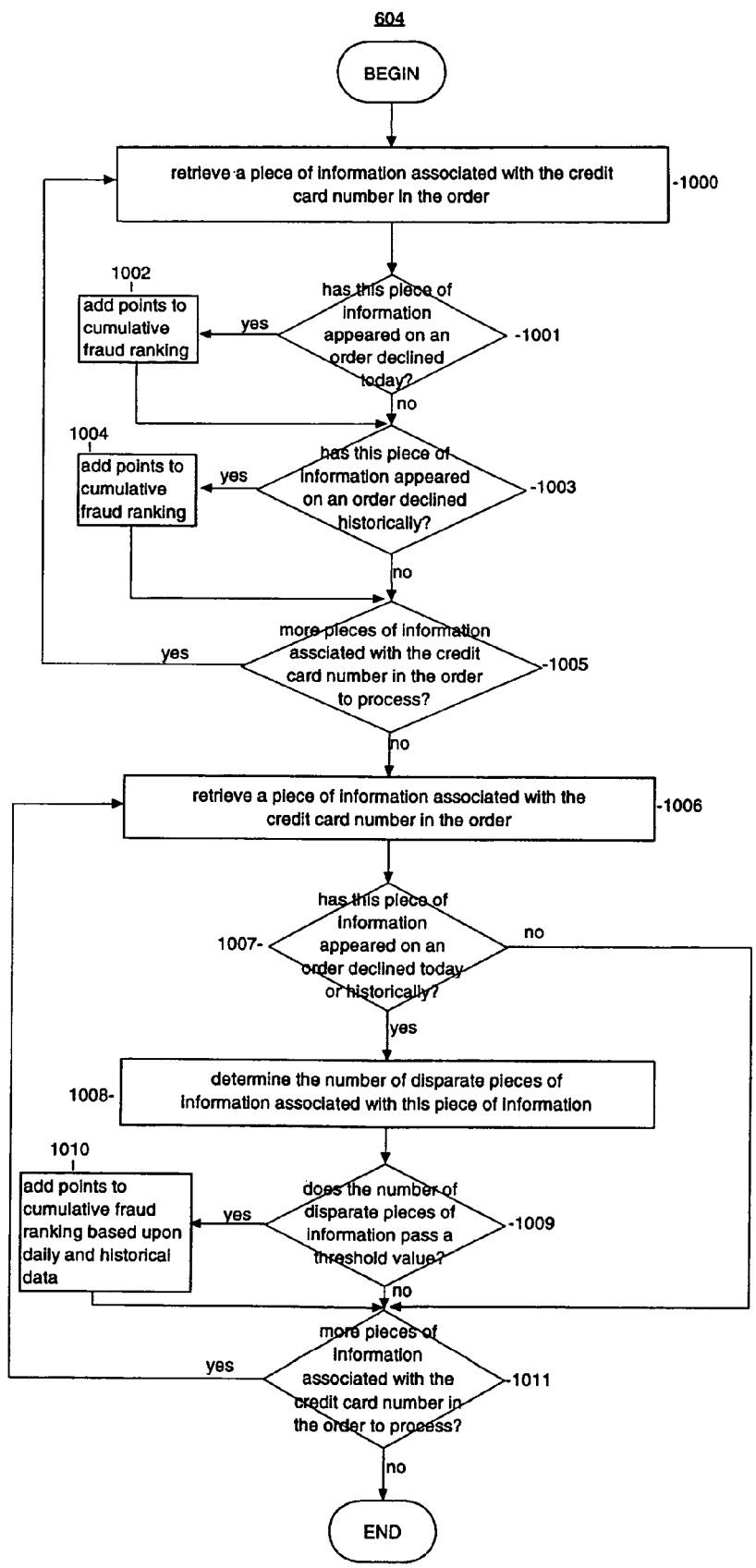
FIG. 10 is a flow chart of an exemplary process for performing a fraud shield of an electronic commerce transaction for use in detecting and preventing fraud.

FIG. 10 is a flow chart of process 604 for performing a fraud shield (adaptive learning) for information in an order being processed. The fraud shield involves cross-referencing information associated with a credit card number on the order and checking that information for past use tending to indicate attempts at fraud. System 200 retrieves a piece of information associated with the credit card number in the order (step 1000), which may be accomplished by accessing tables in the database cross-referencing the credit card number with any information that has appeared with that credit card number on an order. System 200 determines whether this piece of information appeared on an order declined today (step 1001); if so, it adds points to the cumulative fraud ranking (step 1002). System 200 also determines if this piece of information appeared on an order declined historically (step 1003); if so, it adds points to the cumulative fraud ranking (step 1004). System 200 determines if the order contains more information to process associated with the credit card number (step 1005) and, if so, it repeats steps 1000–1004 to process additional pieces of information associated with the credit card number in the order. System 200 typically knows the various sections on an order form used to submit an order, such as order form 520, and may be configured to process the pieces of information in the sections in a predetermined sequence.

Another aspect of the fraud shield involves determining the number of disparate pieces of information associated with a particular piece of information. For example, system 200 checks how many different names have been used with an e-mail address on an order. If the number of names exceeds a particular threshold and the e-mail address has appeared on a declined order, system 200 adds points to the cumulative fraud ranking. System 200 first retrieves a piece of information associated with the credit card number used in the order (step 1006). System 200 determines if this piece of information has appeared on an order declined either today or historically (step 1007), which may be accomplished using the cross-referencing of tables and database look ups illustrated in FIG. 5C. If this piece of information has not appeared on a declined order, system 200 permits an unlimited number of disparate pieces of information associated with this piece of information without adding points to the cumulative fraud ranking.

Otherwise, if this piece of information has appeared on a declined order, system 200 determines the number of disparate pieces of information associated with this piece of information (step 1008), which may be determined by performing a database look up. System 200 determines if the number of disparate pieces of information exceeds a threshold value (step 1009); if so, system 200 adds points to the cumulative fraud ranking based upon daily and historical data (step 1010). For example, system 200 may add a certain number of points if the threshold was exceeded today and add a different number of points if it was exceeded historically. In addition, system 200 may add points based upon how much the number of disparate pieces of information exceeds the threshold. For example, if system 200 permits four names per e-mail before adding points, it may add a certain number of points for each additional name used beyond four. System 200 then determines if the more pieces of information to process are associated with the credit card number in the order (step 1011) and, if so, it repeats steps 1006–1010 to process that information. System 200 typically knows the various sections on an order form used to submit an order, such as order form 520, and may be configured to process the pieces of information in the sections in a predetermined sequence.

After the processing shown in the flow charts of FIGS. 7–10, system 200 has completed determining the cumulative fraud ranking for a particular order submitted by a user. It may then, if necessary, normalize the cumulative fraud ranking and compare it with a particular predetermined scale to determine a likelihood that this order is being used in attempted fraud (step 505 shown in FIG. 5D). Empirical evidence may be used to determine the particular numbers of fraud points to add for each of the various steps in the flow charts of FIGS. 7–10 that involve adding fraud points to the cumulative fraud ranking. In addition, system 200 may be fine-tuned by modifying the particular numbers of fraud points as more orders are processing and the resulting saved information provides additional empirical evidence.

Figure 11:
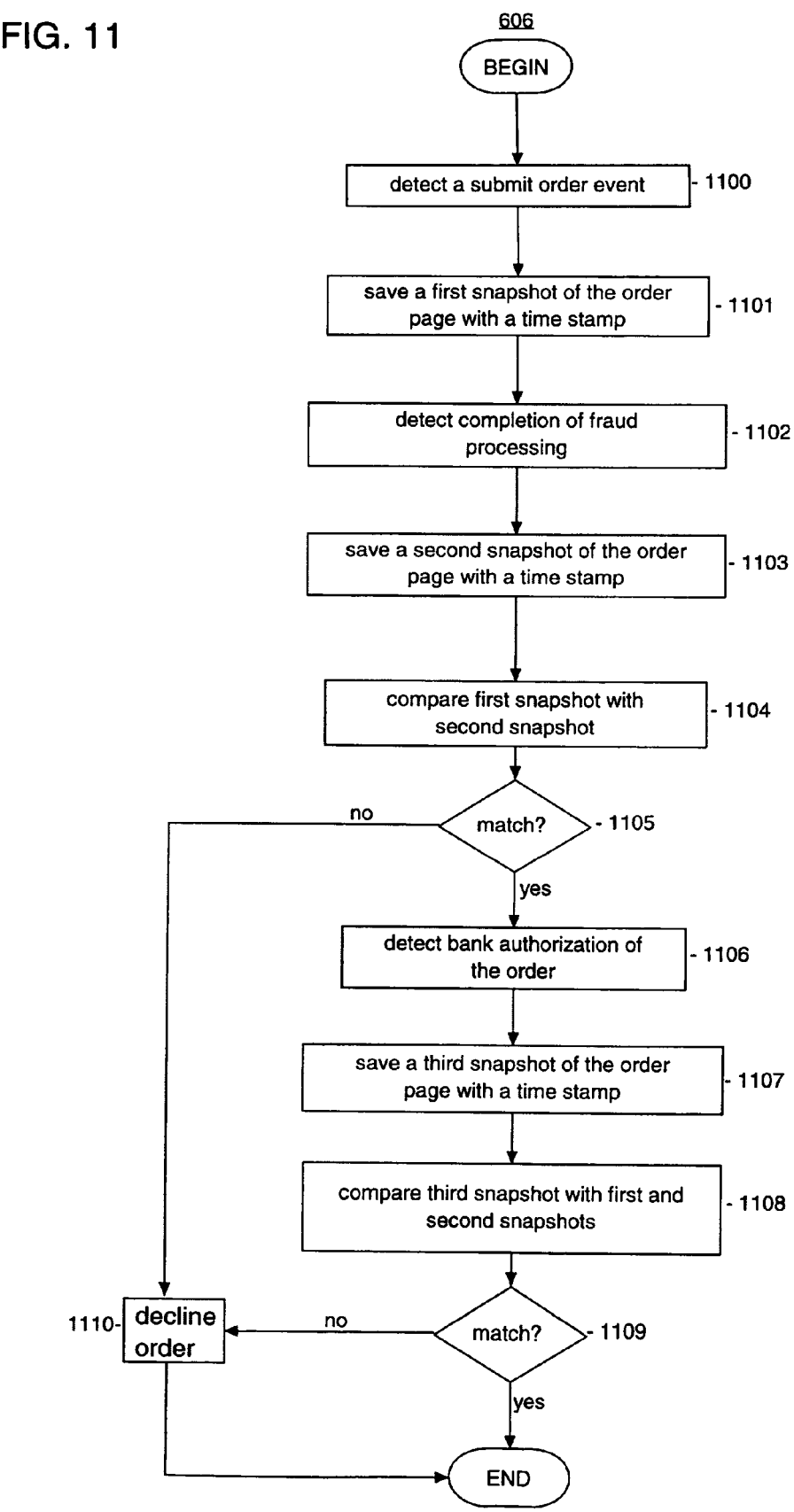
FIG. 11 is a flow chart of an exemplary process for performing snapshots for use in detecting and preventing fraud during electronic commerce transactions.

In addition to generating the cumulative fraud ranking when processing orders, system 200 also detects attempts at fraud by analyzing whether information in the order has changed during processing of it. This procedure, shown as process 606 in FIG. 11, is referred to as snapshots. System 200 records snapshots of pages containing the order form and compares those pages during order processing. If any information in the order changes during processing of it, system 200 declines the order. Once a user submits an order, the user should not change any information in it. Some users, in an attempt to circumvent system 200, may repeatedly submit the same order while changing a dollar amount in an attempt to receive the benefit of a higher dollar amount than what was charged to the user's credit card.

In process 606, system 200 detects a submit order event (step 1100), which occurs when a user selects or "clicks on" a submit section of an electronic order, such as submit section 528 in order form 520. Upon detecting that event, system 200 saves a first snapshot of the order page along with a time stamp (step 1101). System 200 next detects completion of the fraud processing used to generate the cumulative fraud ranking, such as the processing in step 504 and related steps (step 1102). Upon completion of the fraud processing, system 200 saves a second snapshot of the order page with a time stamp (step 1103). System 200 compares the first and second snapshots to determine if any information in it has changed during order processing (steps 1104 and 1105). If they do not match, system 200 declines the order and typically presents a message to the user that the order is declined (step 1110).

Otherwise, if the first and second snapshots match, system 200 detects completion of bank authorization of the order, such as the processing in step 502 (step 1106). Upon receiving bank authorization, system 200 saves a third snapshot of the order page (step 1107). System 200 compares the third snapshot with the first and second snapshots to determine if they match (steps 1107 and 1108). If they do not match, system 200 declines the order (step 1110). If all the snapshots match, system 200 proceeds with order processing. The sequence of steps 1100–1104 and 1106–1109 may be performed in either order, depending whether fraud processing is performed before or after the system attempts to obtain bank authorization. For example, if the system attempts to obtain bank authorization before performing fraud processing, as shown in FIG. 5D, steps 1106–1109 may be performed before steps 1100–1104. Also, snapshots may be taken at other points in the process and compared with previous or subsequent snapshots. In addition, by using time stamps, system 200 may determine a rate at which information potentially changes within the same order or, for example, a rate at which a user submits a particular piece of information such as a credit card number. The rate information may further be used to detect and prevent fraud. For example, system 200 may determine that the same user is repeatedly submitting orders having different credit card numbers in a short time frame requesting purchase of the same product, which may indicate attempted fraud, particularly given a short time frame.

Global Web Site Management

This feature of electronic commerce system 200 involves providing centralized management of host sites, managing all host sites through a central database. It may include, for example, extending a look and feel of a particular web site into another web site. For example, when an intermediate server transfers an end user's connection to a commerce network server, as described with respect to FIG. 1, the commerce network server may transmit a page having the same look and feel as the page on the intermediate server, thus providing an apparent seamless transition to the end user.

This feature also may include making local changes to a large number of managed web sites. Therefore, instead of making similar changes to each individual web site, system 200 may broadcast those particular changes and make the corresponding changes to the managed web sites. It thus provides an advantage, for example, of easily making changes to a large number of web sites. For example, it may automatically broadcast a few particular features every week to the managed web sites in order to regularly update the sites.

Security Area

The feature of electronic commerce system 200 provides for securely storing clients' products and providing a secure download process, typically without the use of wrappers or passwords. This feature generally involving the series of modules shown in FIG. 2. It includes a database type of security intended at least to simplify the purchase process for a user. A user typically need only enter a credit card number and in response receives a requested product.

Cache Management for Dynamic Web Pages

This feature of electronic commerce system 200 concerns a dynamic cache providing for a fast page response and dynamic pages, typically guaranteeing that pages contain current information. It generally involves caches 216, 217 and 218 shown in FIG. 2, providing cache processing for three areas: product searching; GUI implementation (particular features on a web page); and static page building (a web page as a whole).

The complexity of product searching often affects speed of a response. Providing caching of information means that the same information need not be repeatedly retrieved from an external database and constructed into a responsive web page. Rather, the information may be cached locally and quickly retrieved in response to the same or a similar request. This feature maintains up-to-date information by knowing to create and destroy information interactively for the caches.

Intelligent Agent

An intelligent agent includes an application that resides locally on a client machine in order to perform processing specific to a user of the machine, generally involving agent module 203 and agent transaction server 219 shown in FIG. 2. It includes at least two aspects, a pull side and a push side. The pull side involves the agent obtaining information and knowing how to link to a server and provide the information to the user in a personal way, customized for that user. It shields the user from the order process, for example, in order to simplify it. The agent may also perform system management, for example, performing a background process that scans the user's system in order to manage licensed software, perform archival control, and perform other such processing.

The push side involves making special information available to the user through the agent. For example, if the user already ordered a particular product, the agent may inform the user of any bugs in the product, product upgrades, or related products. That information is "pushed" to the agent from the server. The server may provide initial filtering of information given to the agents, and the agents perform additional filtering in order to present the information in a specific way to the user.

While the present invention has been described in connection with an exemplary embodiment, it will be understood that many modifications will be readily apparent to those skilled in the art, and this application is intended to cover any adaptations or variations thereof. For example, different labels for the various modules and databases, and various hardware embodiments for the servers and machines, may be used without departing from the scope of the invention. This invention should be limited only by the claims and equivalents thereof.

What is claimed is:

1. An electronic commerce system having a server and an end user machine interacting through a network during an electronic commerce transaction, the server comprising:
   a software module configured to receive user-entered information via the network including an electronic purchase order for a product within the electronic commerce system; and
   a fraud detection mechanism active during electronic commerce transactions configured to determine a fraud ranking that indicates a likelihood that the electronic purchase order is attempted fraud based upon a user's real-time interaction with the server during a transaction to process the electronic purchase order selected from a group consisting of: (i) an attempt to change information in the electronic purchase order detected by a comparison of a snapshot of information about the electronic purchase order taken after the purchase order has been submitted for processing by the system, and (ii) a user's path of progression through web pages associated with submitting the electronic purchase order.

2. The electronic commerce system of claim 1 wherein the fraud detection mechanism includes a software module configured to also determine the fraud ranking based upon a number of times user-entered information was included in an electronic purchase order that was declined.

3. The electronic commerce system of claim 1 wherein the fraud detection mechanism includes a software module configured to also determine the fraud ranking based upon a number of times user-entered information was included in an electronic purchase order that failed to obtain credit card authorization.

4. The electronic commerce system of claim 1 wherein the fraud detection mechanism includes a software module configured to also determine the fraud ranking based upon comparing a number of disparate pieces of information related to user-entered information with particular criteria.

5. The electronic commerce system of claim 1 wherein the fraud detection mechanism includes a software module configured to compare the fraud ranking against a particular fraud scale.

6. The electronic commerce system of claim 1 wherein the fraud detection mechanism includes a software module configured to (i) save snapshots of information in the electronic purchase order at first and second times after the electronic purchase order has been submitted and (ii) compare the snapshot of information in the electronic purchase order saved at the first time with the snapshot of information in the electronic purchase order saved at the second time.

7. The electronic commerce system of claim 1 wherein the fraud detection mechanism includes a software module configured to also determine the fraud ranking based upon an amount of each of a number of electronic purchase orders requested within a particular time frame associated with a particular user.

8. The electronic commerce system of claim 1 wherein the fraud detection mechanism includes a software module configured to also determine the fraud ranking based upon a number of electronic purchase orders requested within a particular time frame associated with a particular user.

9. The electronic commerce system of claim 1 further comprising a fraud prevention mechanism that declines an electronic purchase order based on the fraud ranking determined by the fraud detection mechanism.

10. A method performed by an electronic commerce system having a server and an end user machine interacting through a network during an electronic commerce transaction, the method comprising steps of:
   receiving user-entered information via the network including an electronic purchase order for a product within the electronic commerce system; and
   determining a fraud ranking that indicates a likelihood that the electronic purchase order is attempted fraud based upon a user's real-time interaction with the electronic commerce system during a transaction to process the electronic purchase order selected from a group consisting of: (i) an attempt to change information in the electronic purchase order detected by a comparison of a snapshot of information about the electronic purchase order taken after the purchase order has been submitted for processing by the system, and (ii) a user's path of progression through web pages associated with submitting the electronic purchase order.

11. The method of claim 10 wherein the determining step further comprises determining the fraud ranking based upon a number of times the user-entered information was included in an electronic purchase order that was declined.

12. The method of claim 10 wherein the determining step further comprises determining the fraud ranking based upon a number of times the user-entered information was included in an electronic purchase order that failed to obtain credit card authorization.

13. The method of claim 10 wherein the determining step further comprises determining the fraud ranking based upon comparing a number of disparate pieces of information related to the user-entered information with particular criteria.

14. The method of claim 10 further comprising a step of comparing the fraud ranking against a particular fraud scale.

15. The method of claim 10 further comprising steps of:
saving snapshots of information in the electronic purchase order at first and second times after the electronic purchase order has been submitted; and
comparing the snapshot of information in the electronic purchase order saved at the first time with the snapshot of information in the electronic purchase order saved at the second time.

16. The method of claim 10 wherein the determining step further comprises determining the fraud ranking based upon an amount of each of a number of electronic purchase orders requested within a particular time frame associated with a particular user.

17. The method of claim 10 wherein the determining step further comprises determining the fraud ranking based upon a number of electronic purchase orders requested within a particular time frame associated with a particular user.

18. The method of claim 10 further comprising a step of preventing fraud by declining an electronic purchase order based on the fraud ranking determined by the determining step.

19. An article of manufacture including instructions stored on a medium for controlling an electronic commerce system having a server and an end user machine interacting through a network during an electronic commerce transaction, the medium comprising software modules configured to control the electronic commerce system to perform the steps of claim 10.

20. An article of manufacture including instructions stored on a medium for controlling an electronic commerce system having a server and an end user machine interacting through a network during an electronic commerce transaction, the medium comprising:
a software module configured to receive user-entered information via the network including an electronic purchase order for a product within the electronic commerce system; and
a fraud detection software module configured to be active during electronic commerce transactions and further configured to determine a fraud ranking that indicates a likelihood that the electronic purchase order is attempted fraud based upon a user's real-time interaction with the electronic commerce system during a transaction to process the electronic purchase order selected from a group consisting of: (i) an attempt to change information in the electronic purchase order detected by a comparison of a snapshot of information about the electronic purchase order taken after the purchase order has been submitted for processing by the system, and (ii) a user's path of progression through web pages associated with submitting the electronic purchase order.

* * * * *